(12) United States Patent
Zhao

(10) Patent No.: US 12,323,888 B2
(45) Date of Patent: Jun. 3, 2025

(54) PARAMETER CONFIGURATION METHOD

(71) Applicant: Huawei Cloud Computing Technologies Co., Ltd., Guizhou (CN)

(72) Inventor: Can Zhao, Shenzhen (CN)

(73) Assignee: HUAWEI CLOUD COMPTING TECHNOLOGIES CO., LTD., Guizhou (CN)

( * ) Notice: Subject to any disclaimer, the term of this patent is extended or adjusted under 35 U.S.C. 154(b) by 1153 days.

(21) Appl. No.: 17/169,736

(22) Filed: Feb. 8, 2021

(65) Prior Publication Data

US 2021/0168573 A1 Jun. 3, 2021

Related U.S. Application Data

(63) Continuation of application No. PCT/CN2019/097802, filed on Jul. 26, 2019.

(30) Foreign Application Priority Data

Aug. 9, 2018 (CN) .......................... 201810903615.3

(51) Int. Cl.
*H04W 4/40* (2018.01)
*H04L 41/0823* (2022.01)
(Continued)

(52) U.S. Cl.
CPC ........... *H04W 4/40* (2018.02); *H04L 41/0823* (2013.01); *H04L 41/0866* (2013.01); *H04W 4/06* (2013.01); *H04W 24/02* (2013.01)

(58) Field of Classification Search
None
See application file for complete search history.

(56) References Cited

U.S. PATENT DOCUMENTS

2017/0153314 A1 6/2017 Siemes
2018/0242190 A1 8/2018 Khoryaev et al.
(Continued)

FOREIGN PATENT DOCUMENTS

CN 101364952 A 2/2009
CN 106712874 A 5/2017
(Continued)

OTHER PUBLICATIONS

3GPP TS 23.285 V15.1.0, "3rd Generation Partnership Project; Technical Specification Group Services and System Aspects; Architecture enhancements for V2X services (Release 15)," Jun. 2018, 36 pages.
(Continued)

*Primary Examiner* — Adolf Dsouza
(74) *Attorney, Agent, or Firm* — Conley Rose, P.C.

(57) ABSTRACT

In a parameter configuration method, when the terminal requests a parameter of the PC5 interface, a home platform server of the terminal generates a configuration rule for the configuration parameter, requests first configuration parameters from configuration entities capable of configuring the PC5 interface, and then combines, according to the configuration rule, the first configuration parameters generated by the configuration entities, to obtain a second configuration parameter used to configure the PC5 interface. The home platform server of the terminal directly or indirectly controls, by generating the configuration rule, the configuration parameter finally used to configure the PC5 interface.

20 Claims, 17 Drawing Sheets

S501: Obtain at least one group of first configuration parameters

S502: Summarize the at least one group of first configuration parameters according to a configuration rule, to generate a second configuration parameter

(51) Int. Cl.
*H04L 41/0866* (2022.01)
*H04W 4/06* (2009.01)
*H04W 24/02* (2009.01)

(56) References Cited

U.S. PATENT DOCUMENTS

| | | | | |
|---|---|---|---|---|
| 2018/0332585 | A1* | 11/2018 | Faurie | H04W 72/12 |
| 2019/0174280 | A1 | 6/2019 | Xu et al. | |
| 2019/0319840 | A1* | 10/2019 | Cheng | H04L 67/12 |
| 2020/0045579 | A1* | 2/2020 | Xu | H04L 1/0015 |
| 2020/0120707 | A1* | 4/2020 | Hassan Hussein | H04W 74/02 |
| 2021/0006954 | A1* | 1/2021 | Xu | H04L 47/767 |
| 2023/0013993 | A1* | 1/2023 | Mach | H04W 4/40 |

FOREIGN PATENT DOCUMENTS

| | | |
|---|---|---|
| CN | 107015227 A | 8/2017 |
| CN | 107027105 A | 8/2017 |
| CN | 107040959 A | 8/2017 |
| CN | 107733955 A | 2/2018 |
| CN | 107925906 A | 4/2018 |
| CN | 108040108 A | 5/2018 |
| EP | 3439394 A1 | 2/2019 |
| WO | 2017043940 A1 | 3/2017 |
| WO | 2017167287 A1 | 10/2017 |
| WO | 2017172479 A1 | 10/2017 |

OTHER PUBLICATIONS

3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Jun. 2018, 357 pages.

CATT, "Consideration on design for eNB scheduling PCS V2V", 3GPP TSG RAN WG1 Meeting #83 R1-156608, Anaheim, USA, Nov. 15-Nov. 22, 2015, 4 Pages.

3GPP TS 23.285 V15.0.0 (Mar. 2018), "3rd Generation Partnership Project; Technical Specification Group Services and System Aspects; Architecture enhancements for V2X services(Release 15)," Mar. 2018, 36 Pages.

* cited by examiner

PARAMETER CONFIGURATION METHOD

CROSS-REFERENCE TO RELATED APPLICATIONS

This is a continuation of Int'l Patent App. No. PCT/CN2019/097802, filed on Jul. 26, 2019, which claims priority to Chinese Patent App. No. 201810903615.3, filed on Aug. 9, 2018, which are incorporated by reference.

FIELD

The present disclosure relates to the field of communications technologies, and in particular, to a PC5 parameter configuration method in vehicle-to-everything (V2X) communication.

BACKGROUND

With rapid development of economy and society, vehicle population in China is increasing rapidly, but road traffic accidents occur frequently. Road traffic safety has become an important factor affecting public safety in China. To improve security and intelligence of a traffic system, a concept of an intelligent traffic system is gradually emerging. In recent years, development of the intelligent traffic system mainly focuses on the intelligent highway traffic system field, namely, vehicle-to-everything.

As an application-oriented concept extension of the internet of things, a V2X communications technology is a technology of extracting and effectively using attribute information and static and dynamic information of all vehicles on an information network platform by using sensors, vehicle-mounted terminals and electronic labels on the vehicles and by using identification technologies such as a radio frequency identification technology, and effectively monitoring running statuses of all the vehicles and providing comprehensive services based on different functional requirements. The V2X communications technology mainly includes the following four aspects.

Vehicle-to-vehicle (V2V) communication refers to communication between on-board units (OBUs) on vehicles.

Vehicle-to-infrastructure (V2I) communication refers to communication between a vehicle and a roadside unit (RSU).

Vehicle-to-pedestrian (V2P) communication refers to communication between a vehicle and a pedestrian.

Vehicle-to-network (V2N) communication refers to communication between a vehicle and a network side.

In the V2X communications technology, two complementary transmission modes are provided, and the two transmission modes are respectively applicable to a case in which a vehicle is near and a case in which the vehicle is far away.

One transmission mode is direct communication through a PC5 interface, and the direct communication is based on a D2D proximity service (ProSe) in Long-Term Evolution (LTE). High-density communication can be implemented for a vehicle at a high speed of 250 km/h through the PC5 interface. In an environment not covered by an LTE network, adjacent devices can directly communicate with each other.

The other transmission mode is network communication through a Uu interface. Information is transmitted to another node through a V2X server by using LTE broadcast.

The 3rd Generation Partnership Project (3GPP) TS 23.285 defines three PC5 interface parameter configuration methods, including: 1. Pre-configuring a PC5 parameter in a terminal. 2. A V2X control function (CF) configures a PC5 parameter of UE through a V3 interface. 3. An Evolved UMTS Terrestrial Radio Access Network (E-UTRAN) configures a PC5 parameter through the Uu interface.

In addition, in a cloud-assisted PC5 architecture (as shown in FIG. 2) defined by the 5G Automotive Association (5GAA), a PC5 interface of a terminal is configured by using a V2X application server. In addition, the regional V2X platform is divided into two layers. A common cloud entity (CCE) generates and stores a PC5 parameter, and a proprietary cloud entity (PCE) is responsible for configuring and delivering the PC5 parameter.

In some approaches, for a same terminal, different standard organizations define a plurality of configuration manners, and there are a plurality of paths for configuring the terminal. Consequently, a conflict may occur between configuration parameters of different configuration manners. However, currently, there is no proper solution to reasonably coordinate a configuration parameter that should be used by the terminal.

SUMMARY

In view of this, embodiments of the present disclosure provide a parameter configuration method and a device, to coordinate configuration parameters of configuration entities for a terminal, so as to avoid a conflict when the configuration entities configure a PC5 interface of the terminal.

According to a first aspect, an embodiment of the present disclosure provides a parameter configuration method. The method includes: A terminal obtains first configuration parameters generated by configuration entities, summarizes the first configuration parameters according to a configuration rule to obtain a second configuration parameter, and then configures a PC5 interface based on the second configuration parameter. In the method provided in this embodiment of the present disclosure, a home platform server of the terminal directly or indirectly controls, by generating the configuration rule, the configuration parameters finally used to configure the PC5 interface of the terminal. This can coordinate the configuration parameters of the configuration entities for the PC5 interface, and avoid a conflict between the configuration parameters of the configuration entities for the PC5 interface of the terminal.

The terminal may receive, before or after sending a first request message to the home platform server, the configuration rule generated by the home platform server. The configuration rule includes a configuration entity identifier, configuration permission, and a configuration priority.

The terminal may send the first request message to the home platform server. The first request message is used to obtain a configuration parameter of the PC5 interface of the terminal. Then, the home platform server sends a second request message to each of the configuration entities based on the first request message sent by the terminal, to obtain the first configuration parameters generated by the configuration entities and send the first configuration parameters to the terminal. Alternatively, when sending the second request message to each of the configuration entities, the home platform server may indicate the configuration entities to directly send the first configuration parameters to the terminal. Optionally, after receiving the configuration rule generated by the home platform server, the terminal may alternatively actively send a second request message to each of the configuration entities, to obtain the first configuration parameters generated by the configuration entities. The terminal receives the first configuration parameters generated by the configuration entities.

Optionally, the terminal may send a third request message to the home platform server. The third request message is used to request to update the parameter of the PC5 interface of the terminal. In another implementation, the terminal may directly send a fourth request message to each of the configuration entities. The fourth request message is used to request the configuration entities to update the configuration parameter of the PC5 interface of the terminal. In some scenarios, the terminal may be triggered to update the configuration parameter of the PC5 interface. When the terminal needs to update the parameter of the PC5 interface, the terminal may obtain, by using the home platform server, an updated first configuration parameter generated by the configuration entities, or may directly obtain an updated first configuration parameter from the configuration entities.

Optionally, the terminal may select to update only some of the configuration parameters.

Optionally, when the terminal runs across regions, a parameter update procedure may be triggered. The terminal may send a third request message to the home platform server, to request to update the configuration parameter of the PC5 interface when switching between the regions. The terminal receives the configuration rule of the home platform server and the first configuration parameters generated by the configuration entities, and generates an updated second configuration parameter according to the configuration rule. When the terminal runs across the regions, a corresponding configuration parameter needs to be used in a transition region. In this case, the first configuration parameters need to be combined according to a new configuration rule, to generate an updated second configuration parameter. Optionally, the second configuration parameter updated when the terminal runs across the regions may include a plurality of groups of configuration parameters of the PC5 interface of the terminal for different regions. When obtaining the configuration parameter of the PC5 interface in the transition region, the terminal may also obtain a configuration parameter of the PC5 interface in a new region. In this way, the configuration parameter of the PC5 interface in the transition region and the configuration parameter of the PC5 interface in the new region can be simultaneously obtained through one update procedure. This can avoid PC5 communication interruption when the terminal switches between regions.

It should be noted that, when the terminal runs across the regions, the terminal simultaneously obtains first configuration parameters generated by configuration entities in two adjacent regions, to generate a second configuration parameter used for the transition region.

According to a second aspect, an embodiment of the present disclosure provides a parameter configuration method. In the method, a home platform server receives a first request message sent by a terminal, and then sends a second request message to each of configuration entities. The home platform server receives first configuration parameters sent by the configuration entities and summarizes the received first configuration parameters according to a configuration rule, to generate a second configuration parameter, and then sends the second configuration parameter to the terminal. In the method provided in this embodiment of the present disclosure, the home platform server of the terminal generates the configuration rule, combines, according to the configuration rule, the first configuration parameters generated by the configuration entities, and then sends the generated second configuration parameter to the terminal, to directly control a configuration parameter of a PC5 interface of the terminal. This can coordinate configuration parameters of the configuration entities for the PC5 interface, and avoid a conflict between the configuration parameters of the configuration entities for the PC5 interface of the terminal.

The first request message is used to obtain the configuration parameter of the PC5 interface of the terminal, and the second request message is generated by the home platform server based on the first request message and is used to obtain the first configuration parameters generated by the configuration entities.

The home platform server may generate the configuration rule for the parameter of the PC5 interface of the terminal before or after receiving the first request message sent by the terminal. The configuration rule includes a configuration entity identifier, configuration permission, and a configuration priority.

Optionally, when the terminal needs to update the configuration parameter of the PC5 interface, the terminal may select to obtain an updated configuration parameter by using the home platform server. In this case, the home platform server receives a third request message sent by the terminal. The third request message is used to request to update the configuration parameter of the PC5 interface of the terminal. The home platform server sends a fourth request message to each of the configuration entities. The fourth request message is generated based on the third request message, and is used to obtain first parameters generated by the configuration entities. After receiving the new first configuration parameters generated by the configuration entities, the home platform server combines the first configuration parameters according to the configuration rule, to generate a new second configuration parameter, and sends the new second configuration parameter to the terminal. The terminal configures the PC5 interface based on the new second configuration parameter. To be specific, a parameter update procedure is completed.

Optionally, when the terminal runs across regions, the configuration parameter of the PC5 interface need to be updated in a transition region. In this case, the home platform server receives a third request message sent by the terminal, and then sends a fourth request message to each of the configuration entities. The fourth request message is generated by the home platform server based on the third request message, and is used to obtain updated first configuration parameters generated by the configuration entities. After receiving the updated first configuration parameters generated by the configuration entities, the home platform server combines the updated first configuration parameters according to the configuration rule, to generate an updated second configuration parameter, and sends the updated second configuration parameter to the terminal. The terminal configures the PC5 interface based on the updated second configuration parameter. Optionally, the second configuration parameter may include a plurality of groups of configuration parameters of the PC5 interface of the terminal for different regions. When obtaining the configuration parameter of the PC5 interface in the transition region, the terminal may also obtain a configuration parameter of the PC5 interface in a new region. In this way, the configuration parameter of the PC5 interface in the transition region and the configuration parameter of the PC5 interface in the new region can be simultaneously obtained through one update procedure. This can avoid PC5 communication interruption when the terminal switches between the regions.

It should be noted that, when the terminal runs across the regions, the home platform server needs to simultaneously obtain first configuration parameters from configuration entities in two adjacent regions, to generate a second configuration parameter used for the transition region.

According to a third aspect, an embodiment of the present disclosure provides a parameter configuration method. In the method, a configuration entity receives a second request message. The second request message is used to obtain a second configuration parameter, and the second request message includes a configuration rule generated by a home platform server. The configuration entity generates a first configuration parameter and receives first configuration parameters generated by other configuration entities. The configuration entity summarizes the received first configuration parameters and the generated first configuration parameter according to the configuration rule to generate the second configuration parameter. Then, the configuration entity sends the generated second configuration parameter to the home platform server or a terminal. In the method provided in this embodiment of the present disclosure, the home platform server generates the configuration rule, and sends the configuration rule to the configuration entity, so that the configuration entity may receive the first configuration parameters generated by the other configuration entities and summarize, to generate the second configuration parameter, so as to indirectly control the configuration parameter of the PC5 interface of the terminal. This can coordinate configuration parameters of configuration entities for the PC5 interface, and avoid a conflict between the configuration parameters of the configuration entities for the PC5 interface of the terminal.

The foregoing method is applicable to a network architecture in which one of the configuration entities is located at a key node in a network, and the configuration entity may be specified to summarize the first configuration parameters generated by the configuration entities. In the method provided in this embodiment of the present disclosure, a feature of the network architecture can be fully used, and efficiency of generating the second configuration parameter can be improved.

Optionally, when the terminal needs to update the configuration parameter of the PC5 interface, the configuration entity may receive a fourth request message sent by the home platform server. The fourth request message is used to request to update the configuration parameter of the PC5 interface of the terminal. Optionally, the configuration entity may alternatively receive a fourth request message sent by the terminal. The fourth request message may be used to request to update at least one of the configuration parameters of the PC5 interface.

According to a fourth aspect, an embodiment of the present disclosure provides a parameter configuration method. In the method, a terminal sends a first configuration request message to a home platform server. The terminal receives a second configuration parameter generated by a configuration entity, and checks the configuration parameter according to a configuration rule. If the second configuration parameter complies with the configuration rule, the terminal configures a PC5 interface based on the second configuration parameter. In the method, a configuration entity summarizes first configuration parameters according to the configuration rule generated by the home platform server and generates the second configuration parameter. Then, the terminal checks, according to the configuration rule, the second configuration parameter generated by the configuration entity. The configuration rule is generated by the home platform server and the terminal is managed and controlled by the home platform server. Therefore, the home platform server indirectly controls a configuration parameter of the PC5 interface of the terminal. This can coordinate configuration parameters of configuration entities for the PC5 interface, and avoid a conflict between the configuration parameters of the configuration entities for the PC5 interface of the terminal.

Optionally, after receiving the configuration rule generated by the home platform server, the terminal may actively send a second request message to each of the configuration entities, to obtain the second configuration parameter generated by the configuration entity, or the home platform server may send a second request message to each of the configuration entities based on the first request message sent by the terminal, to obtain the second configuration parameter generated by the configuration entity.

According to a fifth aspect, an embodiment of the present disclosure provides a parameter configuration method. In the method, a home platform server receives a first request message sent by a terminal, and then sends a second request message to each of configuration entities. The home platform server receives a second configuration parameter generated by the configuration entity, checks the received second configuration parameter according to a configuration rule, and then sends the second configuration parameter to the terminal. In the method provided in this embodiment of the present disclosure, the home platform server of the terminal generates the configuration rule, indicates the configuration entity to combine first configuration parameters according to the configuration rule to generate the second configuration parameter, then checks the second configuration parameter according to the configuration rule, and sends the second configuration parameter to the terminal, to directly control a configuration parameter of a PC5 interface of the terminal. This can coordinate configuration parameters of configuration entities for the PC5 interface, and avoid a conflict between the configuration parameters of the configuration entities for the PC5 interface of the terminal.

The second request message is used to obtain the second configuration parameter generated by the configuration entity.

According to a sixth aspect, an embodiment of the present disclosure provides a terminal. The terminal has a function of implementing the method according to the first aspect or the fourth aspect. The function may be implemented by hardware, or may be implemented by hardware executing corresponding software. The hardware or the software includes one or more modules corresponding to the function.

According to a seventh aspect, an embodiment of the present disclosure provides a terminal, including a processor, a memory, a bus, and a communications interface. The memory is configured to store a computer-executable instruction. The processor is connected to the memory through the bus. When the terminal runs, the processor executes the computer-executable instruction in the memory, so that the terminal performs the parameter configuration method according to any one of the first aspect or the fourth aspect.

According to an eighth aspect, an embodiment of the present disclosure provides a computer-readable storage medium, and the computer-readable medium stores an instruction. When the instruction is run on a computer, the computer may be enabled to perform the parameter configuration method according to any one of the first aspect or the fourth aspect.

According to a ninth aspect, an embodiment of the present disclosure provides a computer program product including an instruction. When the computer program product runs on a computer, the computer may be enabled to perform the parameter configuration method according to any one of the first aspect or the fourth aspect.

For a technical effect brought by any design manner in the sixth aspect to the ninth aspect, refer to technical effects brought by different design manners in the first aspect or the fourth aspect. Details are not described again herein.

According to a tenth aspect, an embodiment of the present disclosure provides a home platform server. The home platform server has a function of implementing the method according to the second aspect or the fifth aspect. The function may be implemented by hardware, or may be implemented by hardware executing corresponding software. The hardware or the software includes one or more modules corresponding to the function.

According to an eleventh aspect, an embodiment of the present disclosure provides a home platform server, including a processor, a memory, a bus, and a communications interface. The memory is configured to store a computer-executable instruction. The processor is connected to the memory through the bus. When the terminal runs, the processor executes the computer-executable instruction in the memory, so that the home platform server performs the parameter configuration method according to any one of the second aspect or the fifth aspect.

According to a twelfth aspect, an embodiment of the present disclosure provides a computer-readable storage medium, and the computer-readable medium stores an instruction. When the instruction is run on a computer, the computer may be enabled to perform the parameter configuration method according to any one of the second aspect or the fifth aspect.

According to a thirteenth aspect, an embodiment of the present disclosure provides a computer program product including an instruction. When the computer program product runs on a computer, the computer may be enabled to perform the parameter configuration method according to any one of the second aspect or the fifth aspect.

For a technical effect brought by any design manner in the tenth aspect to the thirteenth aspect, refer to technical effects brought by different design manners in the second aspect or the fifth aspect. Details are not described again herein.

According to a fourteenth aspect, an embodiment of the present disclosure provides a configuration entity. The configuration entity has a function of implementing the method according to the third aspect. The function may be implemented by hardware, or may be implemented by hardware executing corresponding software. The hardware or the software includes one or more modules corresponding to the function.

According to a fifteenth aspect, an embodiment of the present disclosure provides a configuration entity, including a processor, a memory, a bus, and a communications interface. The memory is configured to store a computer-executable instruction. The processor is connected to the memory through the bus. When the configuration entity runs, the processor executes the computer-executable instruction in the memory, so that the configuration entity performs the parameter configuration method according to any one of the third aspect.

According to a sixteenth aspect, an embodiment of the present disclosure provides a computer-readable storage medium, and the computer-readable medium stores an instruction. When the instruction is run on a computer, the computer may be enabled to perform the parameter configuration method according to any one of the third aspect.

According to a seventeenth aspect, an embodiment of the present disclosure provides a computer program product including an instruction. When the computer program product runs on a computer, the computer may be enabled to perform the parameter configuration method according to any one of the third aspect.

For a technical effect brought by any design manner in the fourteenth aspect to the seventeenth aspect, refer to technical effects brought by different design manners in the second aspect or the fifth aspect. Details are not described herein.

These aspects or other aspects of the present disclosure are clearer and more comprehensible in descriptions of the following embodiments.

DETAILED DESCRIPTION

Figure 1:
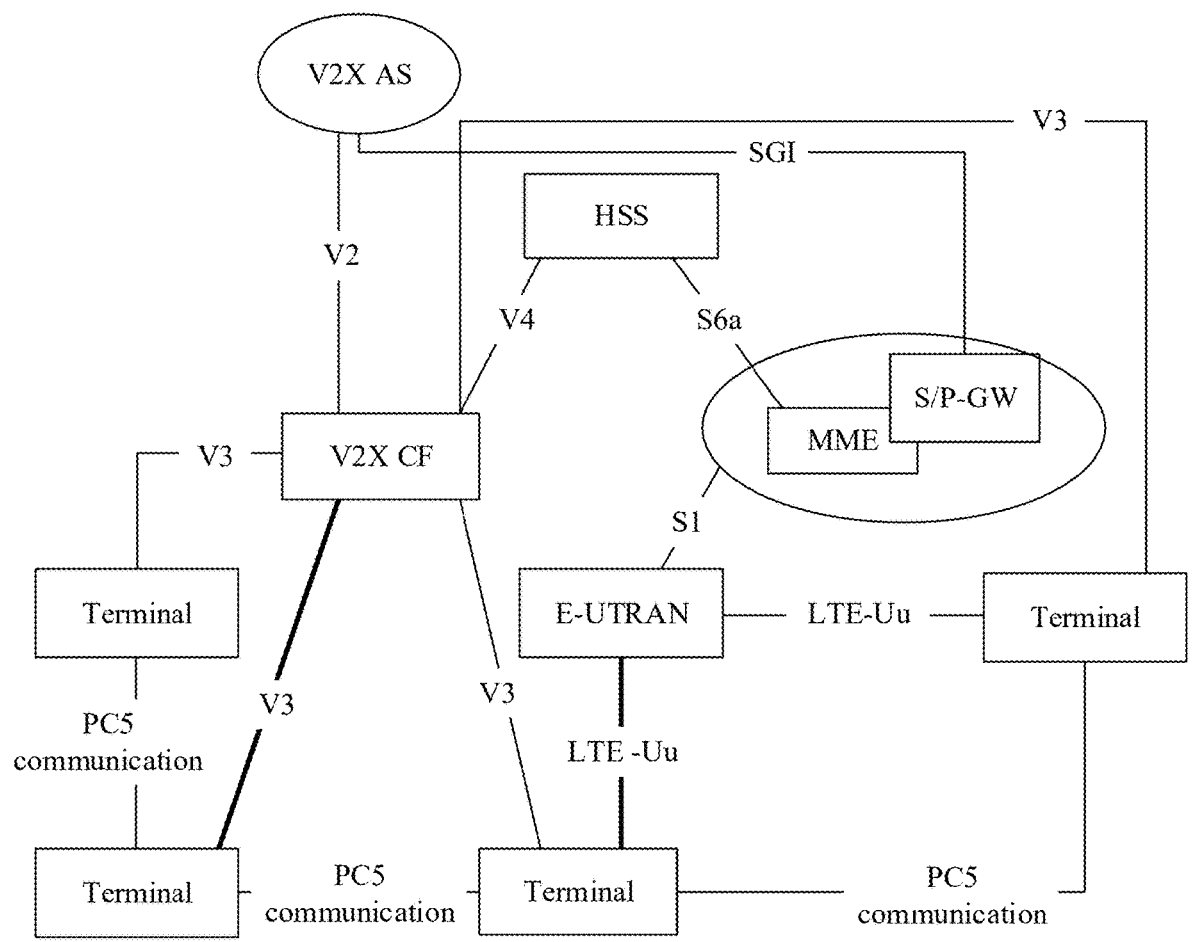
FIG. 1 is a schematic diagram of a V2X reference network architecture defined in the 3GPP TS 23.285.
Figure 2:
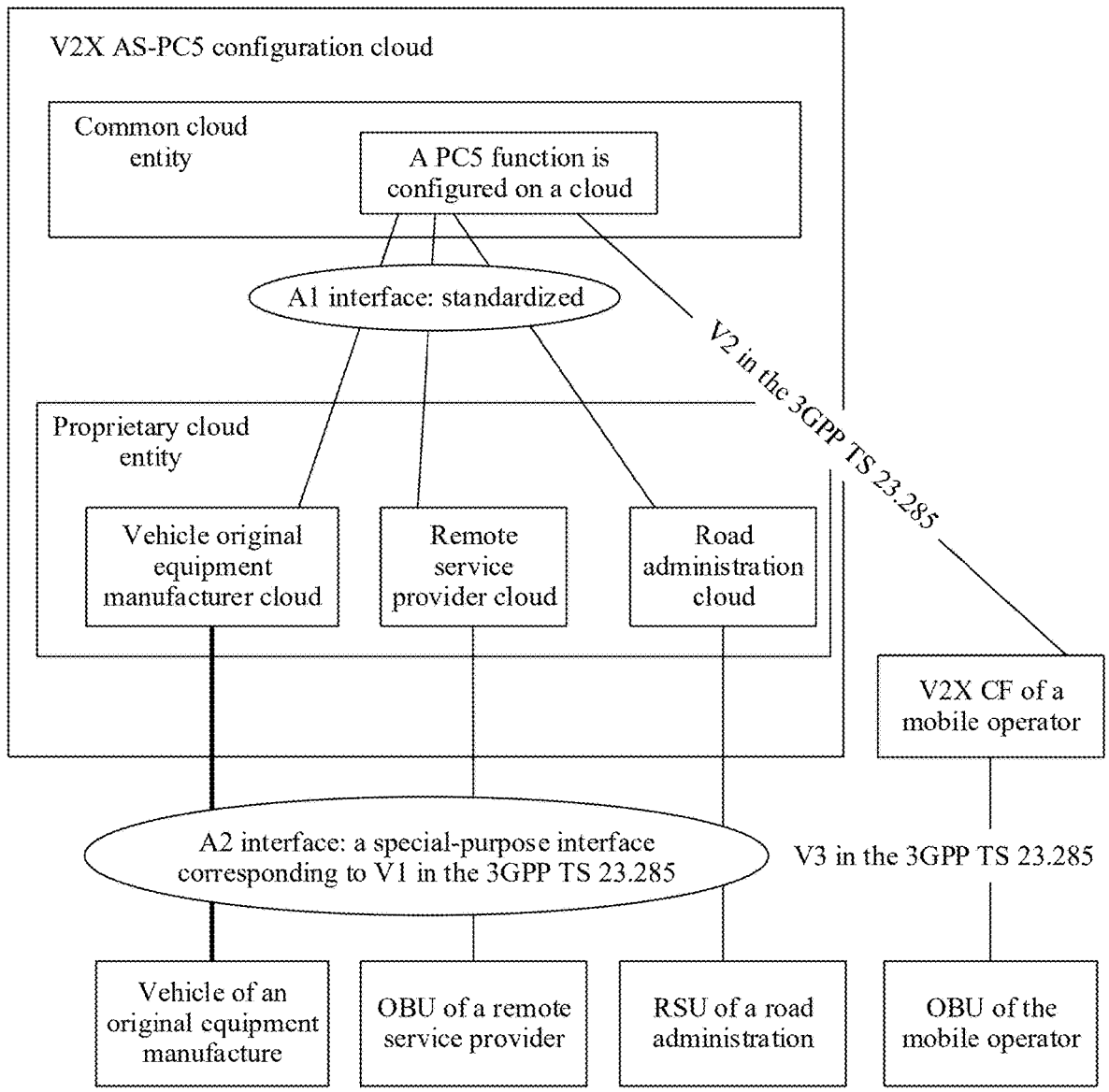
FIG. 2 is a schematic diagram of a cloud-assisted PC5 architecture defined in the 5GAA.

For ease of understanding of technical solutions in embodiments, the following first briefly describes technologies related to this disclosure.

(1) Configuration Rule

The configuration rule in the embodiments is generated by a home platform server, and is used to control configuration entities to generate configuration parameters for a PC5 interface of a terminal, and summarize the configuration parameters generated by the configuration entities.

Based on different scenarios, different network elements, for example, the terminal, the home platform server, or the configuration entity, may summarize the configuration parameters according to the configuration rule.

Table 1 shows a possible data structure of the configuration rule, and the configuration rule specifically includes: a configuration entity identifier, used to identify a regional V2X platform of a region or a V2X CF of an operator; configuration permission, including a parameter that can be configured by a configuration entity and a range of a configurable parameter; and a configuration priority. For some configuration parameters that can be configured by a plurality of configuration entities, an entity that configures a configuration parameter with a higher priority may be specified. The configuration rule may further include transition region information of a neighboring region, a combination rule of a plurality of configuration parameters, and the like.

There may be different configuration rules based on different scenarios. For example, because the regional V2X platform globally masters PC5 parameter configuration information in the region, it may be set that the regional V2X platform may have configuration permission on all configuration parameters. The V2X CF and an eNB each may directly perform PC5 communication with the terminal, may have permission to configure a radio parameter related to a network, and may limit a frequency band range of a resource pool. In this case, each configuration entity may configure a corresponding parameter in the parameters of the PC5 interface of the terminal according to the configuration permission set in the configuration rule.

Alternatively, for example, if the configuration rule grants configuration permission to the plurality of configuration entities for some of the configuration parameters, configuration priorities of the configuration entities for these configuration parameters may be set, and a configuration entity with a higher priority may be specified. For example, the V2X CF may be set to have a higher priority for transmit power. In this way, if the transmit power is configured by each of the plurality of configuration entities, the transmit power configured by the V2X CF may be preferentially used when the configuration parameters are summarized.

It should be noted that Table 1 shows only an example of a data structure of the configuration rule, and items in the data structure may be added, deleted, or arranged based on a requirement. This is not specifically limited in this embodiment.

TABLE 1

A possible data structure of a configuration rule

| Configuration entity identifier | Parameter n | Permission | Configuration range | Priority |
| --- | --- | --- | --- | --- |

(2) Configuration Entity

The configuration entity in the embodiments is a general name of network entities capable of configuring the parameter of the PC5 interface of the terminal. The configuration entity in the embodiments may be at least one of the regional V2X platform, the V2X CF, or the eNB.

It should be noted that, with development of the network, the configuration entity may be represented in another form, or another network entity may be set to have a function of configuring the parameter of the PC5 interface of the terminal, and the configuration entity is not limited to the foregoing three network entities. This is not specifically limited in this embodiment.

(3) Configuration Parameter

The configuration parameter in the embodiments is a parameter used to configure the PC5 interface of the terminal. After configuring the PC5 interface based on the configuration parameter, the terminal may communicate with another device through the PC5 interface. The configuration parameter may include information such as parameter configuration validity, radio parameters of different regions, an address update period, and a correspondence between a service and a frequency. The configuration parameter is specified in detail in the 3GPP 24.385, and details are not described herein.

The configuration parameters in the embodiments include a first configuration parameter directly generated by a configuration entity and a second configuration parameter generated by summarizing the first configuration parameters. The first configuration parameter is a general name of configuration parameters generated by configuration entities. Each configuration entity may generate the corresponding configuration parameter according to the configuration rule. These configuration parameters are collectively referred to as the first configuration parameter. There may be more than one first configuration parameter. When a plurality of configuration entities generate configuration parameters, the first configuration parameter may refer to a plurality of configuration parameters or one configuration parameter.

As described above, based on different scenarios, different network elements may summarize the first configuration parameters according to the configuration rule, to generate the second configuration parameter finally used to configure the PC5 interface of the terminal. Generally, one second configuration parameter is generated by summarizing a plurality of first configuration parameters. However, it is not excluded that in a case in which only one configuration entity generates a configuration parameter, the first configuration parameter generated by the configuration entity is also the second configuration parameter.

It should be noted that the first configuration parameter in the embodiments is a configuration parameter directly generated by the configuration entity, and a configuration entity may sequentially generate a plurality of configuration parameters for a same terminal based on a requirement. These configuration parameters are collectively referred to as the first configuration parameter. Similarly, during running of the terminal, the configuration parameter of the PC5 interface may be requested for a plurality of times, and correspondingly, the first configuration parameters may be summarized for a plurality of times to obtain the configuration parameter used to configure the terminal. In the embodiments, the configuration parameters obtained through summarization are collectively referred to as the second configuration parameter.

It should be noted that the second configuration parameter generally includes only one group of configuration parameters. However, in some scenarios, the second configuration parameter may alternatively include a plurality of groups of configuration parameters, and the terminal may select, based on a requirement, one of the plurality of groups of configuration parameters to configure the PC5 interface. As described below, the configuration parameter needs to be updated when the terminal switches between regions, and the second configuration parameter may include a configuration parameter used in a transition region and a configuration parameter used in a region 2.

The following describes the technical solutions in the embodiments of the present disclosure with reference to accompanying drawings in the embodiments of the present disclosure. Specific operation methods in method embodiments may also be used for apparatus embodiments.

Architectures and a service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may know that: With evolution of the network architecture and emergence of a new service scenario, the technical solutions provided in the embodiments of the present disclosure are also applicable to similar technical problems.

Figure 3:
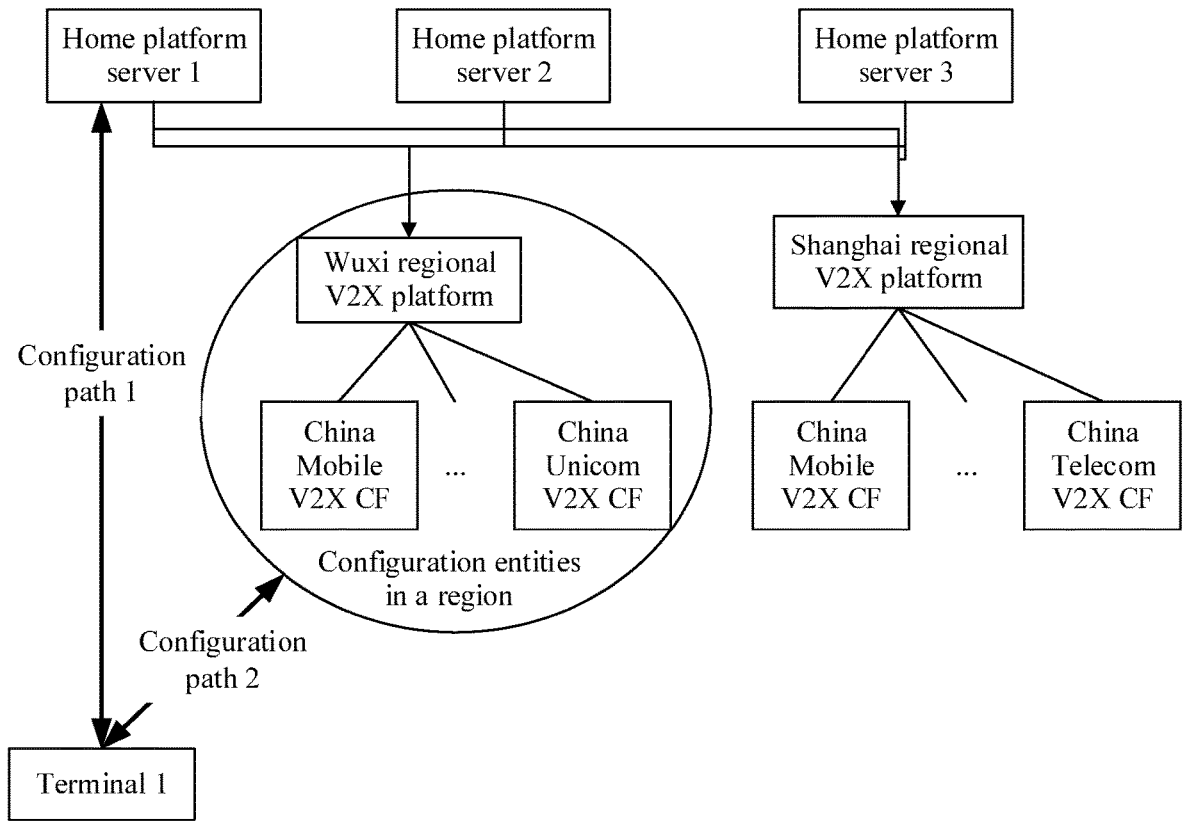
FIG. 3 is a PC5 parameter configuration network architecture according to an embodiment.

FIG. 3 is a schematic diagram of a possible architecture of a network according to an embodiment. The network includes a terminal, a home platform server, a regional V2X platform, and may further include configuration entities such as a V2X CF.

Before the network architecture works, subscription configuration is completed on each platform, to support a V2X communications technology, and the platforms may be preconfigured to implement mutual communication.

In the network, the home platform server of the terminal sets a configuration rule for a configuration parameter of a PC5 interface, including configuration entities capable of configuring the terminal, permission of each configuration entity, a priority of a configuration parameter of each configuration entity, and the like. The home platform server sends the configuration rule to each of the configuration entities and/or the terminal, and the configuration entity and/or the terminal configure and store data according to the configuration rule. Two configuration paths are shown in the network architecture provided in this embodiment. Configuration path 1: The home platform server summarizes first configuration parameters of the configuration entities to generate a second configuration parameter used to configure the PC5 interface of the terminal, and the terminal performs PC5 communication based on the second configuration parameter generated by the home platform server. Configuration path 2: The home platform server sends the configuration rule to the terminal and the configuration entities simultaneously. The configuration entities send the first configuration parameters to the terminal, and the terminal summarizes the first configuration parameters according to the configuration rule and generates the second configuration parameter, and configures the PC5 interface based on the second configuration parameter before performing PC5 communication. In Configuration path 2, a configuration entity, for example, the regional V2X platform, may further summarize first configuration parameters generated by other configuration entities, generate a second configuration parameter, and then send the second configuration parameter to the terminal. The terminal configures the PC5 interface based on the second configuration parameter before performing PC5 communication.

In the foregoing network architecture, the terminal is connected to the home platform server, and is controlled by the home platform server. When subscribing to a V2X service from the home platform server, the terminal needs to request the configuration parameter of the PC5 interface from the home platform server, and receives the configuration parameter that is of the PC5 interface and that is sent by the home platform server. Optionally, the terminal may alternatively receive the configuration rule that is for the parameter of the PC5 interface and that is delivered by the home platform server, and after receiving the configuration parameters of the configuration entities for the PC5 interface of the terminal, summarize the configuration parameters according to the configuration rule, to finally generate the configuration parameter of the PC5 interface of the terminal. Optionally, in some scenarios, when an upper-layer application triggers the terminal to send a V2X message, the terminal needs to determine whether the parameter of the PC5 interface needs to be updated. In this case, a PC5 parameter configuration update procedure of the terminal may be triggered. When the terminal triggers the configuration update procedure, the terminal sends, to the home platform server, a request for obtaining the configuration parameter of the PC5 interface, and receives the configuration parameter that is of the PC5 interface and that is sent by the home platform server. If the terminal has received the configuration rule that is for the parameter of the PC5 interface and that is delivered by the home platform server, the terminal may alternatively directly request the configuration parameters of the PC5 interface from the configuration entities, and summarize the configuration parameters according to the configuration rule, to finally generate the configuration parameter for the PC5 interface of the terminal. In the V2X service, the terminal may be represented in a plurality of forms, and a most typical form is a vehicle. In addition to the vehicle, an OBU, an RSU, or the like is also a terminal in the V2X network. Any terminal for which a parameter of a PC5 interface needs to be configured may be applicable to the technical solutions provided in the embodiments. This is not limited. For ease of description, the foregoing devices are collectively referred to as the terminal.

The regional V2X platform is used as a basic data platform in a region, and is responsible for planning the configuration parameter of the PC5 interface of the terminal in the region. Generally, a plurality of operators provide V2X services in a region. Different operators control different V2X CFs and eNBs. A regional V2X platform in this region can simultaneously interconnect with V2X CF configuration platforms of different operators, and synchronize a configuration parameter on the regional V2X platform to the V2X CFs and the eNBs to implement cross-operator communication. The regional V2X platform may alternatively synchronize the configuration parameter with management platforms of the eNBs based on a requirement. The regional V2X platform is connected to the home platform server, and may send the configuration parameter of the PC5 interface of the terminal to the home platform server. Optionally, the regional V2X platform may alternatively directly send the configuration parameter of the PC5 interface to the terminal.

The home platform server of the terminal is a server that directly manages the terminal, and can directly or indirectly control the configuration parameter of the PC5 interface of the terminal. The home platform server may control the configuration parameter of the PC5 interface of the terminal in two ways. In one way, the home platform server generates the configuration rule for the PC5 interface, and sends the configuration rule to the configuration entities. The configuration entities generate the configuration parameters according to the configuration rule and sends the configuration parameters to the home platform server. After summarizing the first configuration parameters sent by the configuration entities, the home platform server generates the second configuration parameter used to configure the PC5 interface of the terminal, and sends the second configuration parameter to the terminal. Optionally, the home platform server may alternatively select not to send the configuration rule to the configuration entities, but directly request the first configuration parameters from the configuration entities, then summarize the received first configuration parameters according to the configuration rule, generate the configuration parameter used to configure the PC5 interface of the terminal, and send the configuration parameter to the terminal. In the other way, after generating the configuration rule, the home platform server delivers the configuration rule to the terminal. When the terminal requests to obtain the configuration parameter of the PC5 interface, the home platform server forwards the request of the terminal to the configuration entities. Optionally, the configuration entities may send the configuration parameters to the home platform server, and the home platform server forwards the configuration parameters to the terminal; or may directly send the configuration parameters to the terminal. After receiving the first configuration parameters generated by the configuration entities, the terminal summarizes the received configuration parameters according to the configuration rule, and generates the configuration parameter used to configure the PC5 interface of the terminal.

A service scope managed by a single home platform server is only a terminal service managed by the home platform server. Therefore, parameters for PC5 interfaces of all terminals in a region cannot be configured and interconnected. The regional V2X platform is used as a public platform in a region, and aggregates all V2X service data in the region. The home platform server can obtain global parameters of the PC5 interface in the region by using the regional V2X platform, to implement cross-terminal manufacturer and cross-operator communication.

The home platform server may be connected to regional V2X platforms in a plurality of regions, to implement unified management of cross-region and cross-operator configuration of the terminal. In the V2X network, different terminals correspond to different home platforms. A home platform of a vehicle is a platform of a vehicle enterprise, a home platform of the OBU is a telematics service provider (TSP) platform, a home platform of the RSU is a road administration platform, and the like. This is not limited. For ease of description, the foregoing platforms are collectively referred to as the home platform server.

The V2X CF and the eNB are configuration entities of the PC5 interface of the terminal, and are configured to generate the configuration parameters for the PC5 interface according to the request of the terminal and send the configuration parameters to the terminal. The regional V2X platform is used as a basic data platform in a region, and stores configuration parameters of PC5 interfaces of all terminals in the region. The regional V2X platform may further synchronize the configuration parameters to management entities of the V2X CF and the eNB.

Based on the network architecture for configuring the parameter of the PC5 interface provided in this embodiment, the home platform server may set different configuration rules for configuring the parameter of the PC5 interface of the terminal based on a requirement of a specific scenario, and require the configuration entities to generate the configuration parameters according to the configuration rule and send the configuration parameters to the home platform server or the terminal. Then, the home platform or the terminal summarizes the configuration parameters according to the configuration rule, and finally generates the configuration parameter used to configure the PC5 interface of the terminal. In this solution, the home platform server sets the configuration rule, and generates the final configuration parameter for the PC5 interface according to the configuration rule, to avoid a conflict between the configuration parameters of the configuration entities for the PC5 interface of the terminal, so that the home platform server directly or indirectly controls the configuration parameter of the PC5 interface of the terminal.

It should be noted that, when the parameter of the PC5 interface is configured, the V2X CF and the eNB are optional configuration entities. When there is no V2X CF or eNB, an operator does not participate in configuring the parameter of the PC5 interface. The parameter is configured only by the regional V2X platform. When an operator participates in configuring the PC5 parameter, a network communication capability of the terminal can be improved, and cross-network communication of the terminal can be implemented through V2X. A configuration entity from which a configuration parameter is obtained may be specifically controlled by the home platform server by setting the configuration rule.

It should be noted that the foregoing network architecture for configuring the parameter of the PC5 interface may be applied to a 5G network and another future network. Network elements in the foregoing network architecture may have different names in different networks. This is not specifically limited in this embodiment.

Figure 4:
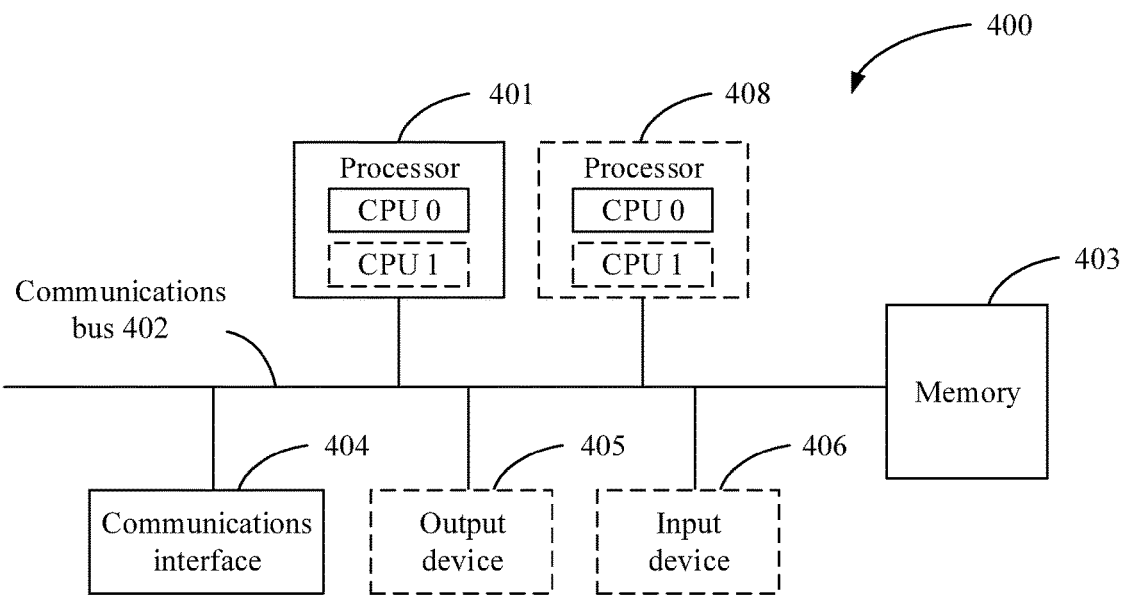
FIG. 4 is a schematic diagram of a hardware structure of a communications device according to an embodiment.

Optionally, the terminal, the home platform server, or the configuration entity in FIG. 3 may be implemented as a communications device in FIG. 4.

FIG. 4 is a schematic diagram of a hardware structure of a communications device according to an embodiment. The communications device 400 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits configured to control program execution of the solutions.

The communications bus 402 may include a path used to transmit information between the foregoing components.

The communications interface 404 is an apparatus using any transceiver, and is configured to communicate with another device or a communications network, for example, the Ethernet, a radio access network (RAN), or a wireless local area network (WLAN). A communications mode may be selected based on an actual scenario. This is not limited.

The memory 403 may be a read-only memory (ROM) or another type of static storage device that can store static information and instructions, or a random-access memory (RAM) or another type of dynamic storage device that can store information and instructions. Alternatively, the memory 403 may be an electrically erasable programmable ROM (EEPROM), a compact disc ROM (CD-ROM) or another compact disc storage, an optical disc storage (including a compact optical disc, a laser disc, an optical disc, a digital versatile disc (DVD), a Blu-ray disc, or the like), a magnetic disk storage medium or another magnetic storage device, or any other medium that can be configured to carry or store expected program code in a form of an instruction or a data structure and that can be accessed by a computer. However, the memory 403 is not limited thereto. The memory may exist independently, and is connected to the processor through the bus. Alternatively, the memory may be integrated with the processor.

The memory 403 is configured to store application program code used to perform the solutions, and the application program code is executed under control of the processor 401. The processor 401 is configured to execute the application program code stored in the memory 403, to implement service continuity implementation methods provided in the following embodiments.

In a specific implementation, in an embodiment, the processor 401 may include one or more CPUs, for example, a CPU 0 and a CPU 1 in FIG. 4.

In a specific implementation, in an embodiment, the communications device 400 may include a plurality of processors, for example, the processor 401 and a processor 408 in FIG. 4. Each of the processors may be a single-core processor or a multi-core processor. The processor herein may refer to one or more devices, circuits, and/or processing cores configured to process data (for example, a computer program instruction).

In a specific implementation, in an embodiment, the communications device 400 may further include an output device 405 and an input device 406. The output device 405 communicates with the processor 401, and may display information in a plurality of manners. For example, the output device 405 may be a liquid-crystal display (LCD), a light-emitting diode (LED) display device, a cathode-ray tube (CRT) display device, a projector, or the like. The input device 406 communicates with the processor 401, and may receive an input of a user in a plurality of manners. For example, the input device 406 may be a mouse, a keyboard, a touchscreen device, or a sensing device.

The communications device 400 may be a general-purpose communications device or a special-purpose communications device. In a specific implementation, the communications device 400 may be a desktop computer, a portable computer, a network server, a wireless terminal device, an embedded device, or a device having a structure similar to that in FIG. 4. A type of the communications device 400 is not limited in this embodiment.

With reference to FIG. 3 and FIG. 4, the following specifically describes a PC5 parameter configuration method in V2X communication according to an embodiment.

Figure 5:
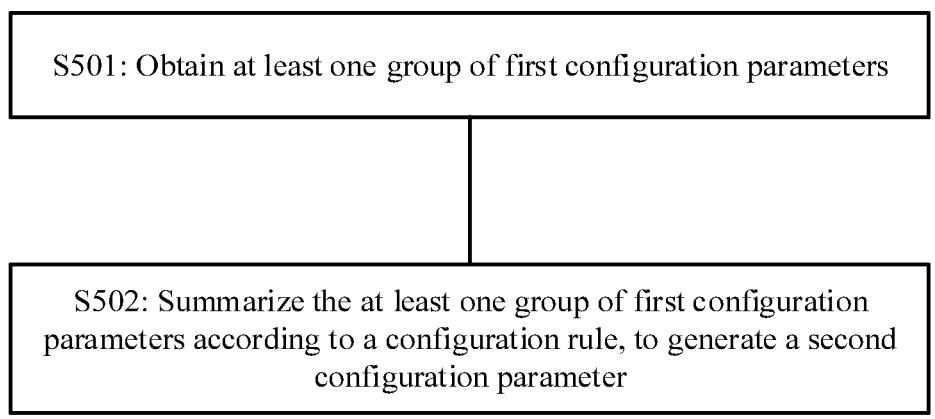
FIG. 5 is a schematic flowchart 1 of a PC5 parameter configuration method according to an embodiment.

As shown in FIG. 5, the PC5 parameter configuration method in V2X communication according to an embodiment includes the following two steps.

S501: Obtain at least one group of first configuration parameters, where the first configuration parameters are generated by configuration entities of a PC5 interface.

In some approaches, there are a plurality of configuration entities capable of configuring PC5 parameters. Therefore, when a parameter of the PC5 interface needs to be configured, these configuration entities may generate the at least one group of first configuration parameters. The at least one group of first configuration parameters generated by the configuration entities may be summarized by a terminal, a home platform server, or a selected configuration entity. Before this, the device needs to obtain the at least one group of configuration parameters from the configuration entities. The first configuration parameter herein refers to a PC5 configuration parameter directly generated by the configuration entity, and is not processed by another device.

S502: Summarize the at least one group of first configuration parameters according to a configuration rule, to generate a second configuration parameter.

The configuration rule is generated by the home platform server. The home platform server may generate the configuration rule when receiving the configuration parameters for the PC5 interface, or may query a prestored configuration rule to obtain the corresponding configuration rule. This is not limited in this embodiment.

The second configuration parameter is a parameter that is generated based on the first configuration parameters and that is used to configure the PC5 interface.

FIG. 5 shows main steps of this solution. The steps in FIG. 5 may be performed by the home platform server, the terminal, or the configuration entity. Different execution bodies implement the foregoing steps in different manners. With reference to FIG. 6A to FIG. 8, the following describes in detail interaction procedures between different devices when the different devices perform the foregoing steps.

Figure 6A:
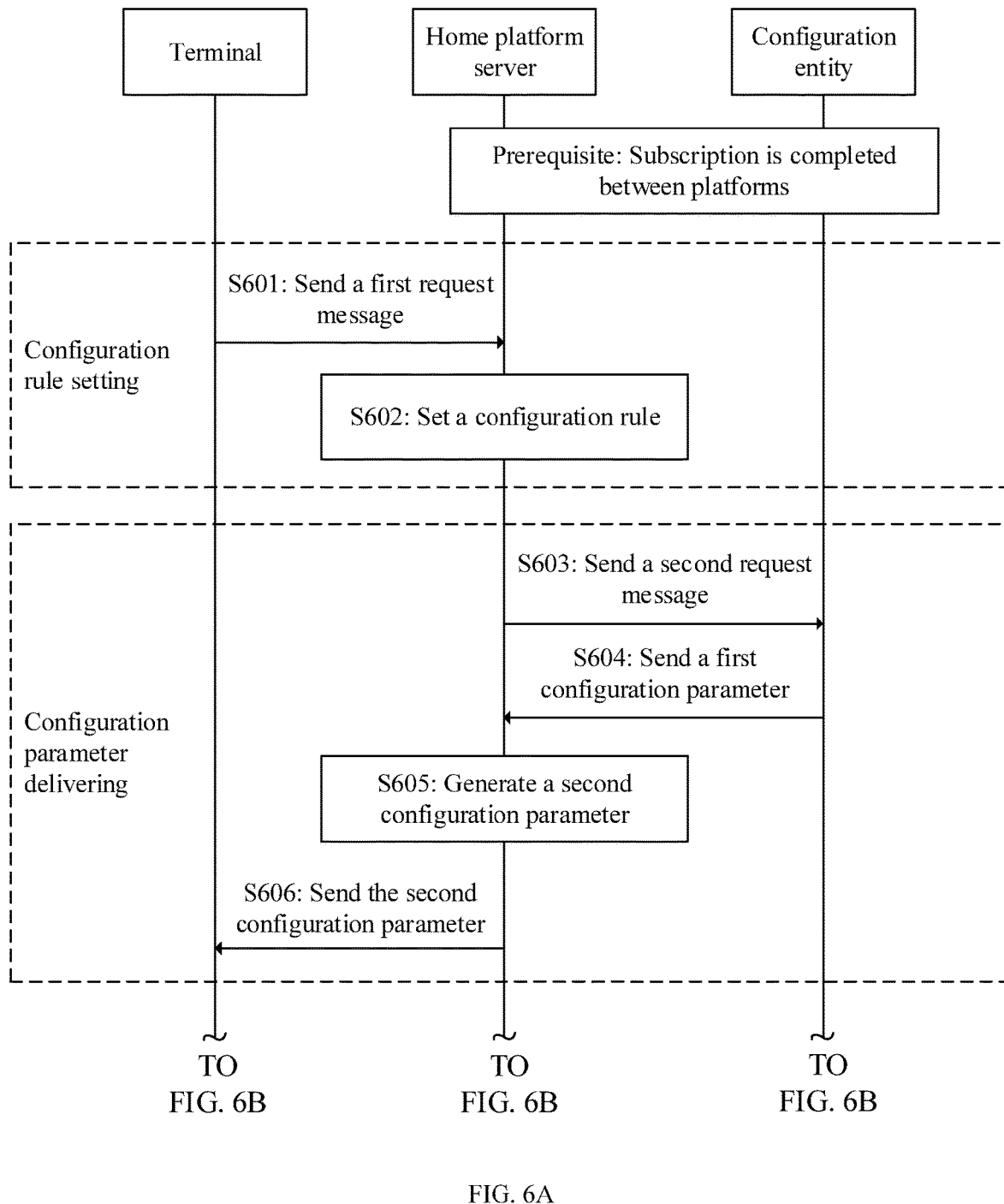
FIG. 6A and FIG. 6B are a schematic flowchart 2 of a PC5 parameter configuration method according to an embodiment.
Figure 6B:
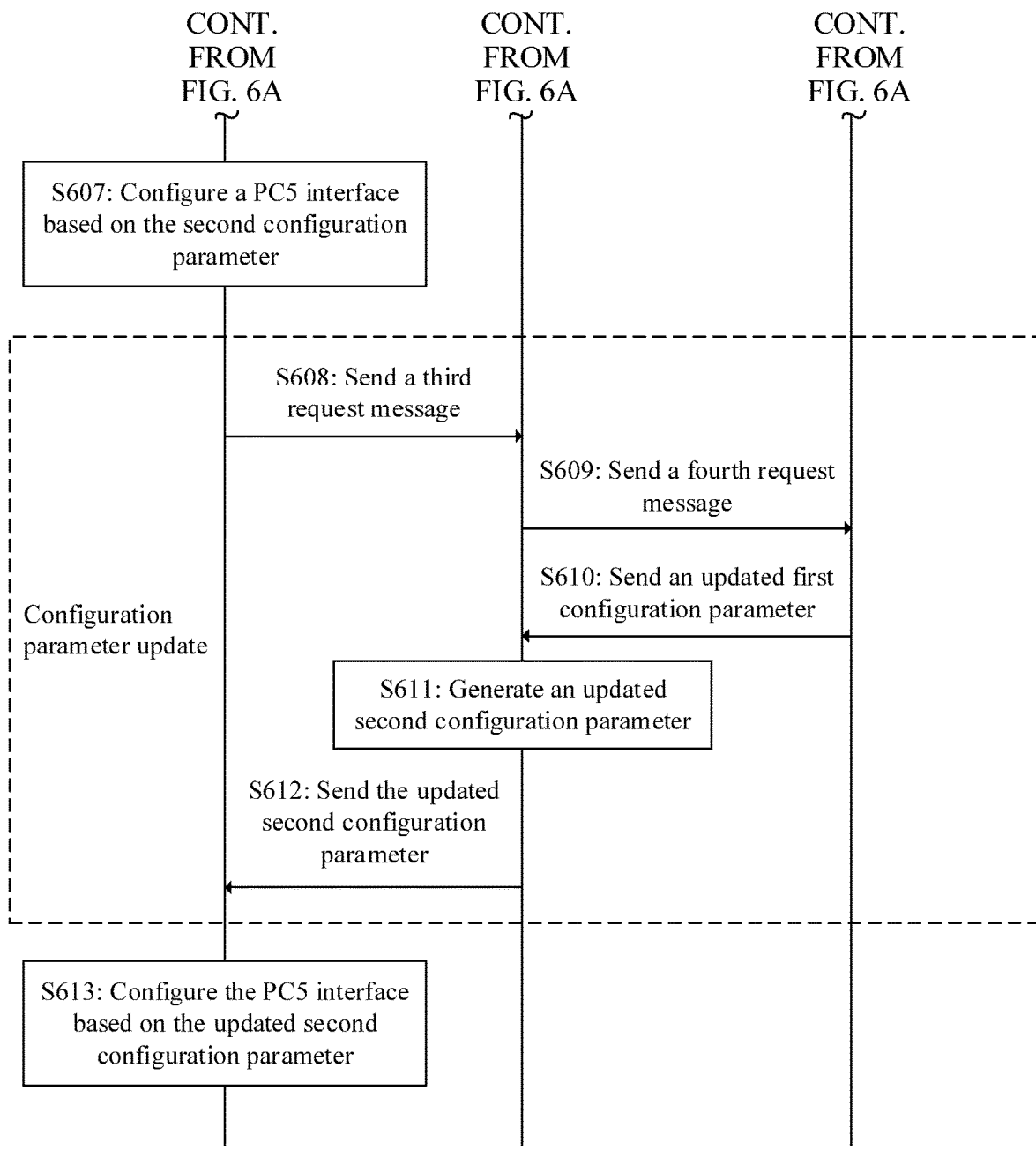

With reference to the PC5 parameter configuration method shown in FIG. 5, FIG. 6A and FIG. 6B show an interaction procedure between network elements when the home platform server performs the steps in FIG. 5. As shown in FIG. 6A and FIG. 6B, interaction between the terminal, the home platform server, and the configuration entities includes the following steps.

S601: The terminal sends a first request message to the home platform server of the terminal.

When the terminal needs to use the PC5 interface for communication, the configuration parameter of the PC5 interface needs to be obtained. The terminal obtains the parameter of the PC5 interface of the terminal by sending the first request message to the home platform server. The first request message may carry information such as a terminal identifier (ID) or device ID, a supported service list or service ID, and location information. Each configuration entity that configures the parameter of the PC5 interface may deliver the corresponding PC5 configuration parameter to the terminal based on the information carried in the first request message. The location information is a location region in which the terminal performs communication through the PC5 interface, and may be identified as an administrative region, for example, the Wuxi city or the Shanghai city, or may be geographical location coordinates, such as polygon information enclosed by a series of longitude and latitude coordinates identified by Global Positioning System (GPS).

Optionally, the first request message may further include home public land mobile network (HPLMN) information, and the home platform server may determine a corresponding configuration entity based on the HPLMN information of the terminal.

In another implementation, the home platform server already includes HPLMN information when the terminal is registered, and the home platform server may find the corresponding HPLMN information based on the device ID of the terminal, to determine a corresponding configuration entity.

S602: The home platform server generates the configuration rule.

The home platform server determines, according to a subscription relationship between platforms and a subscription relationship between the home platform server and a configuration entity in each region, information about a configuration entity in a region ("request region") in which the terminal requests the PC5 configuration parameter, and generates the configuration rule in the request region. The configuration rule is used to specify configuration permission of each configuration entity, a priority of each configuration parameter, and the like.

It should be noted that, after receiving the first request message, the home platform server may generate the corresponding configuration rule in real time, or may generate and save the configuration rule in advance, and select a proper configuration rule based on the information in the first request message when receiving the first request message. The foregoing two manners are both specific manners in which the home platform server generates the configuration rule.

S603: The home platform server sends a second request message to each of the configuration entities.

The home platform server obtains, through query, information about the corresponding configuration entity based on the information in the received first request message of the terminal, generates the second request message, and sends the second request message to the configuration entity.

The second request message includes the terminal identifier, a V2X service list, and a HPLMN ID.

The configuration entity may be at least one of a regional V2X platform, a V2X CF, and an eNB.

Optionally, the second request message further includes the configuration rule generated by the home platform server.

S604: The configuration entities send the first configuration parameters to the home platform server.

After receiving the second request message, the configuration entities each generates the corresponding first configuration parameters based on information carried in the second request message, and sends the first configuration parameters to the home platform server.

Optionally, the home platform server may indicate, in the second request message, the configuration entities to send the first configuration parameters to the terminal or another configuration entity. In this case, the second request message carries an address of the terminal or the another configuration entity.

S605: The home platform server generates the second configuration parameter based on the received first configuration parameters.

The home platform checks validity of the first configuration parameters according to the configuration rule set in S602, summarizes the first configuration parameters based on information such as a configuration priority and a configuration parameter combination rule in the configuration rule, and generates the second configuration parameter. The second configuration parameter is used to configure the PC5 interface of the terminal.

If the home platform server detects that the received first configuration parameter of the configuration entity does not comply with a requirement of the configuration rule, the home platform server may return a configuration failure message to the configuration entity. The message may include a reason why the configuration parameter does not comply with the configuration rule.

It should be noted that if the home platform server receives only one group of first configuration parameters, the home platform server only needs to check whether the first configuration parameter complies with the configuration rule, and check the configuration permission. In this case, the generated second configuration parameter may be the same as the first configuration parameter.

S606: The home platform server sends the second configuration parameter to the terminal.

S607: The terminal configures the PC5 interface based on the second configuration parameter.

In the technical solution provided, after receiving a message of requesting the parameter of the PC5 interface by the terminal, the home platform server sets the configuration rule for the parameter of the PC5 interface, and sends the configuration rule to the configuration entities such as the regional V2X platform, the V2X CF, and the eNB, that configure the parameter of the PC5 interface. The configuration entities generate the first configuration parameters and directly or indirectly send the first configuration parameters to the home platform server. The home platform server summarizes, according to the configuration rule, the first configuration parameters generated by the configuration entities, generate the second configuration parameter used to configure the terminal, and sends the second configuration parameter to the terminal. In the solution provided, the home platform server controls, by generating and managing the configuration rule for the PC5 parameter, a plurality of configuration entities to configure the PC5 parameter of the terminal according to the configuration rule. This implements collaboration between the plurality of configuration entities, avoids a conflict occurring between configuration parameters of different configuration entities, and ensures that the home platform server has absolute control over the configuration parameter of the terminal managed by the home platform server.

After receiving the second configuration parameter sent by the home platform server, the terminal may perform communication after configuring the PC5 interface based on the second configuration parameter. When a service type of the terminal changes or the configuration parameter expires, the terminal may need to update the configuration parameter of the PC5 interface. After the configuration entity replans the configuration parameter based on a service model and a network status, the configuration entity also triggers a PC5 parameter update procedure. FIG. 6A and FIG. 6B further show a working procedure in which the terminal updates the configuration parameter of the PC5 interface, and the working procedure includes the following steps.

S608: The terminal sends a third request message to the home platform server.

When an upper-layer application of the terminal triggers to send a V2X message, the terminal may determine whether a parameter update operation needs to be triggered. When the PC5 parameter needs to be updated, the terminal sends the third request message to the home platform server, and the third request message carries the device ID of the terminal and the configuration parameter requested to be updated.

Optionally, the terminal may select to update only some configuration parameters in the configuration parameters.

S609: The home platform server generates a fourth request message based on the third request message, and sends the fourth request message to a corresponding configuration entity.

The home platform server determines the corresponding configuration entity, for example, the regional V2X platform, the V2X CF, or the eNB, based on a configuration parameter request message sent by the terminal, and sends, to the corresponding configuration entity, the fourth request message that carries the information such as the device ID of the terminal and the configuration parameter requested to be updated.

The fourth request message is used to obtain updated first configuration parameters of the configuration entities.

S610: The configuration entities send the updated first configuration parameters to the home platform server.

After receiving the fourth request message sent by the home platform server, the configuration entity updates the corresponding first configuration parameter and sends the first configuration parameter to the home platform server.

When the configuration parameter of the PC5 interface of the terminal is updated, the updated first configuration parameter generated by the same configuration entity may be the same as or different from the first configuration parameter generated when the terminal requests the configuration parameter.

S611: The home platform server summarizes the received updated first configuration parameters and generates an updated second configuration parameter.

A specific step in which the home platform server generates the updated second configuration parameter is described in S605, and details are not described herein again.

It should be noted that, if only one configuration entity updates the first configuration parameter, in this case, the updated second configuration parameter generated by the home platform server may be the same as the updated first configuration parameter.

S612: The home platform server sends the updated second configuration parameter to the terminal.

S613: The terminal configures the PC5 interface based on the received updated second configuration parameter.

It should be noted that a process of S610 to S613 is similar to that of S604 to S607, and the foregoing descriptions of S604 to S607 may be applicable to the corresponding steps of S610 to S613.

In the foregoing embodiment, the home platform server is configured to generate the configuration rule, summarize, according to the configuration rule, the configuration parameters returned by the configuration entities, and generate the configuration parameter for the PC5 interface of the terminal. In this way, the home platform server may directly control the configuration parameter of the PC5 interface of the terminal.

Actions of the home platform server in S602, S603, S605, S606, S609, S611, and S612 may be performed by the processor 401 in the communications device 400 shown in FIG. 4 by invoking the application program code stored in the memory 403. This is not limited in this embodiment.

Actions of the terminal in S601, S607, S608, and S613 may be performed by the processor 401 in the communications device 400 shown in FIG. 4 by invoking the application program code stored in the memory 403. This is not limited in this embodiment.

Figure 7A:
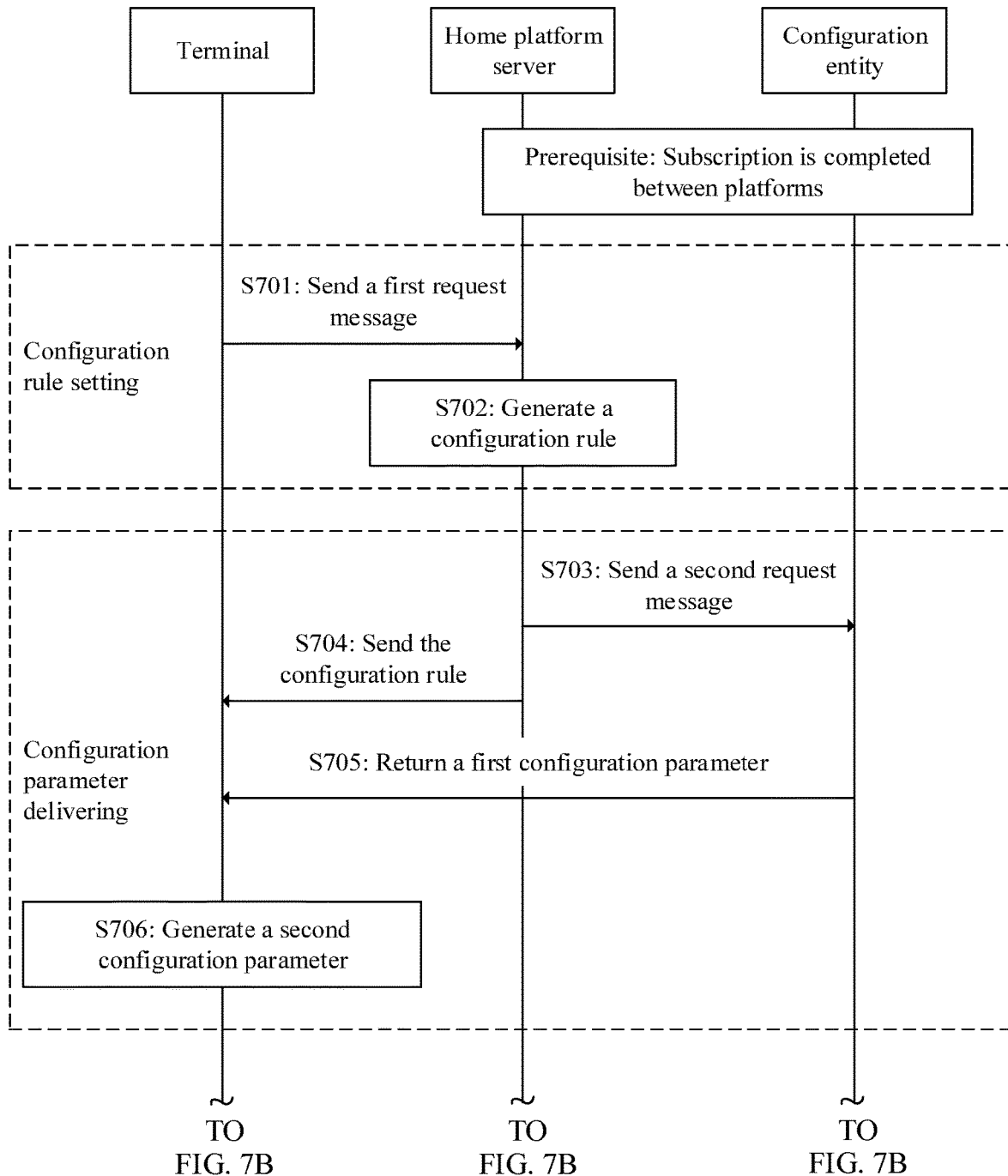
FIG. 7A and FIG. 7B are a schematic flowchart 3 of a PC5 parameter configuration method according to an embodiment.
Figure 7B:
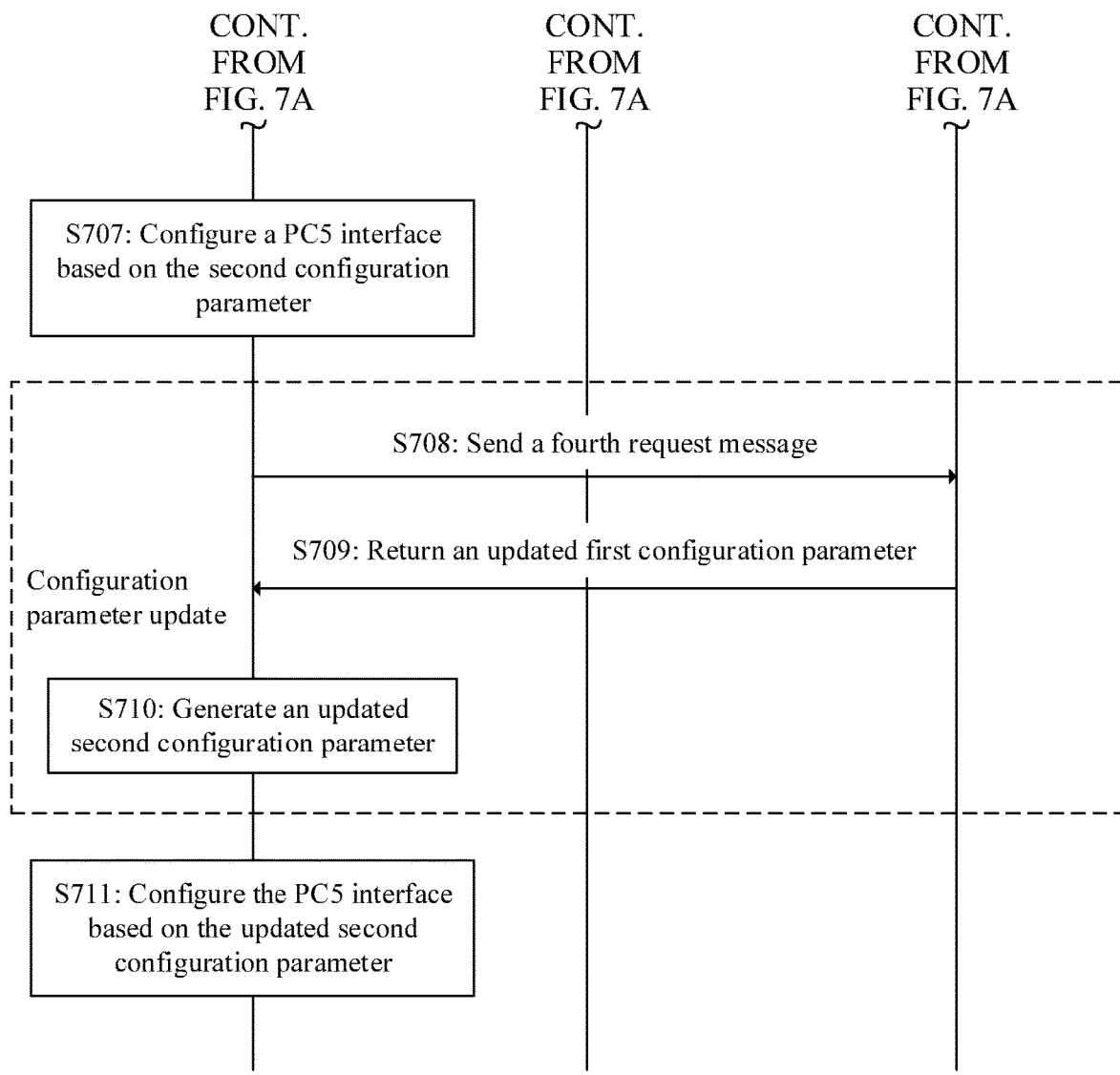

In an optional manner, the home platform server may send the configuration rule to the terminal after generating the configuration rule. In this way, the terminal may perform the steps in FIG. 5 and finally generate the second configuration parameter. FIG. 7A and FIG. 7B are a schematic flowchart of the foregoing solution, including the following steps.

S701 to S703 are the same as S601 to S603. For details, refer to the embodiment shown in FIG. 6A and FIG. 6B. Details are not described herein again.

S704: The home platform server sends the configuration rule to the terminal.

The home platform server sends the configuration rule generated in S702 to the terminal, so that the terminal may summarize, according to the configuration rule, the configuration parameters returned by the configuration entities.

It should be noted that a sequence of S704 is not limited in this embodiment. The home platform server may send the configuration rule to the terminal immediately after generating the configuration rule. In other words, the sequence of S704 and S703 may be exchanged. Alternatively, the home platform server may send the configuration rule to the terminal before the terminal initiates a PC5 configuration parameter obtaining procedure, and the terminal may directly use an existing configuration rule when the terminal needs to obtain the configuration parameter of the PC5 interface.

Optionally, in an implementation, after the home platform server sends the configuration rule to the terminal, the terminal may initiate a request for obtaining the configuration parameters to each of the configuration entities. To be specific, in S703, the second request message is not sent to each of the configuration entities by the home platform server, but by the terminal, to request the first configuration parameters from the configuration entities. The second request message may include the configuration rule.

S705: The configuration entities send the first configuration parameters to the terminal.

Optionally, the home platform server may indicate, in the second request message, the configuration entities to send the first configuration parameters to another configuration entity. In this case, the second request message carries an address of the another configuration entity.

Optionally, the configuration entities may alternatively send the first configuration parameters to the home platform server, and the home platform server sends the first configuration parameters to the terminal.

S706: The terminal summarizes the first configuration parameters and generates the second configuration parameter.

The terminal verifies validity of the configuration parameters according to the configuration rule generated by the home platform server, summarizes the configuration parameters according to a configuration priority in the configuration rule, and generates the second configuration parameter used to configure the PC5 interface of the terminal.

It should be noted that, if only one configuration entity generates the first configuration parameter, in this case, the second configuration parameter generated through summarization may be the same as the first configuration parameter.

S707: The terminal configures the PC5 interface based on the second configuration parameter.

In the technical solution provided, after receiving the first request message of the terminal, the home platform server sets the configuration rule for the parameter of the PC5 interface, and sends the configuration rule to the terminal. The configuration entities send the first configuration parameters to the terminal, and the terminal summarizes, according to the configuration rule, configuration parameters sent by the configuration entities, and generates the second configuration parameter used to configure the PC5 interface of the terminal. In the solution provided, the home platform server sets and manages the configuration rule for the PC5 parameter, and sends the configuration rule to the terminal, to indirectly control a plurality of configuration entities to configure the PC5 parameter of the terminal according to the configuration rule. This implements collaboration between the plurality of configuration entities, avoids a conflict between configuration parameters of different configuration entities, and ensures that the home platform server has an absolute configuration right to the terminal managed by the home platform server.

Different from the embodiment shown in FIG. 6A and FIG. 6B, in this embodiment, because the terminal stores the configuration rule sent by the home platform server, the terminal may automatically summarize the first configuration parameters according to the configuration rule and generate the second configuration parameter. The home platform server does not need to summarize the first configuration parameters and generate the second configuration parameter.

After generating the second configuration parameter used to configure the PC5 interface, the terminal may perform communication after configuring the PC5 interface based on the second configuration parameter. When the service type of the terminal changes or the configuration parameter expires, the terminal may need to update the configuration parameter of the PC5 interface. After the configuration entity replans the configuration parameter based on a service model and a network status, the configuration entity also triggers the PC5 parameter update procedure. FIG. 7A and FIG. 7B further show a working procedure in which the terminal updates the configuration parameter of the PC5 interface, and the working procedure includes the following steps.

S708: The terminal sends a fourth request message to each of the configuration entities.

When an upper-layer application of the terminal triggers to send a V2X message, the terminal determines whether a parameter update operation needs to be triggered. When the PC5 parameter needs to be updated, the terminal sends the fourth request message to each of the configuration entities, to request to update the configuration parameter of the PC5 interface, and the fourth request message carries the device ID of the terminal and the configuration parameter requested to be updated.

It should be noted that, based on a requirement, the terminal may separately send request messages to the plurality of configuration entities to request to update the configuration parameter, and these request messages are collectively referred to as the fourth request message.

Optionally, the terminal may alternatively select to send the third request message to the home platform server, to request to update the parameter of the PC5 interface of the terminal. After receiving the third request message, the home platform server sends the fourth request message to each of the configuration entities, to obtain updated first configuration parameters generated by the configuration entities.

Optionally, the terminal may select to update only some configuration parameters in the configuration parameters.

S709: The configuration entities return the updated first configuration parameters to the terminal.

After receiving the fourth request message sent by the home platform server or the terminal, the configuration entities generate the updated first configuration parameters and send the updated first configuration parameters to the home platform server, and then the home platform server forwards the updated first configuration parameters to the terminal. Alternatively, the configuration entities may directly send the updated first configuration parameters to the terminal.

When the terminal updates the configuration parameter, the updated first configuration parameter generated by the same configuration entity may be the same as or different from the first configuration parameter generated when the terminal requests the configuration parameter.

S710: The terminal summarizes the received updated first configuration parameters and generates an updated second configuration parameter.

A specific step in which the terminal generates the configuration parameter used to configure the PC5 interface of the terminal is described in S706, and details are not described herein again.

S711: The terminal configures the PC5 interface based on the updated second configuration parameter.

It should be noted that a process of S709 to S711 is similar to that of S705 to S707, and the foregoing descriptions of S705 to S707 may be applicable to the corresponding steps of S709 to S711.

In the foregoing embodiment, the home platform server is configured to generate the configuration rule, and send the configuration rule to the terminal. The terminal may summarize, according to the configuration rule, the configuration parameters returned by the configuration entities, and generate the configuration parameter for the PC5 interface. In this way, the home platform server may indirectly control the configuration parameter of the PC5 interface of the terminal.

Actions of the home platform server in S702, S703, and S704 may be performed by the processor 401 in the communications device 400 shown in FIG. 4 by invoking the application program code stored in the memory 403. This is not limited in this embodiment.

Actions of the terminal in S701, S706, S707, S708, S710, and S711 may be performed by the processor 401 in the communications device 400 shown in FIG. 4 by invoking the application program code stored in the memory 403. This is not limited in this embodiment.

Figure 8:
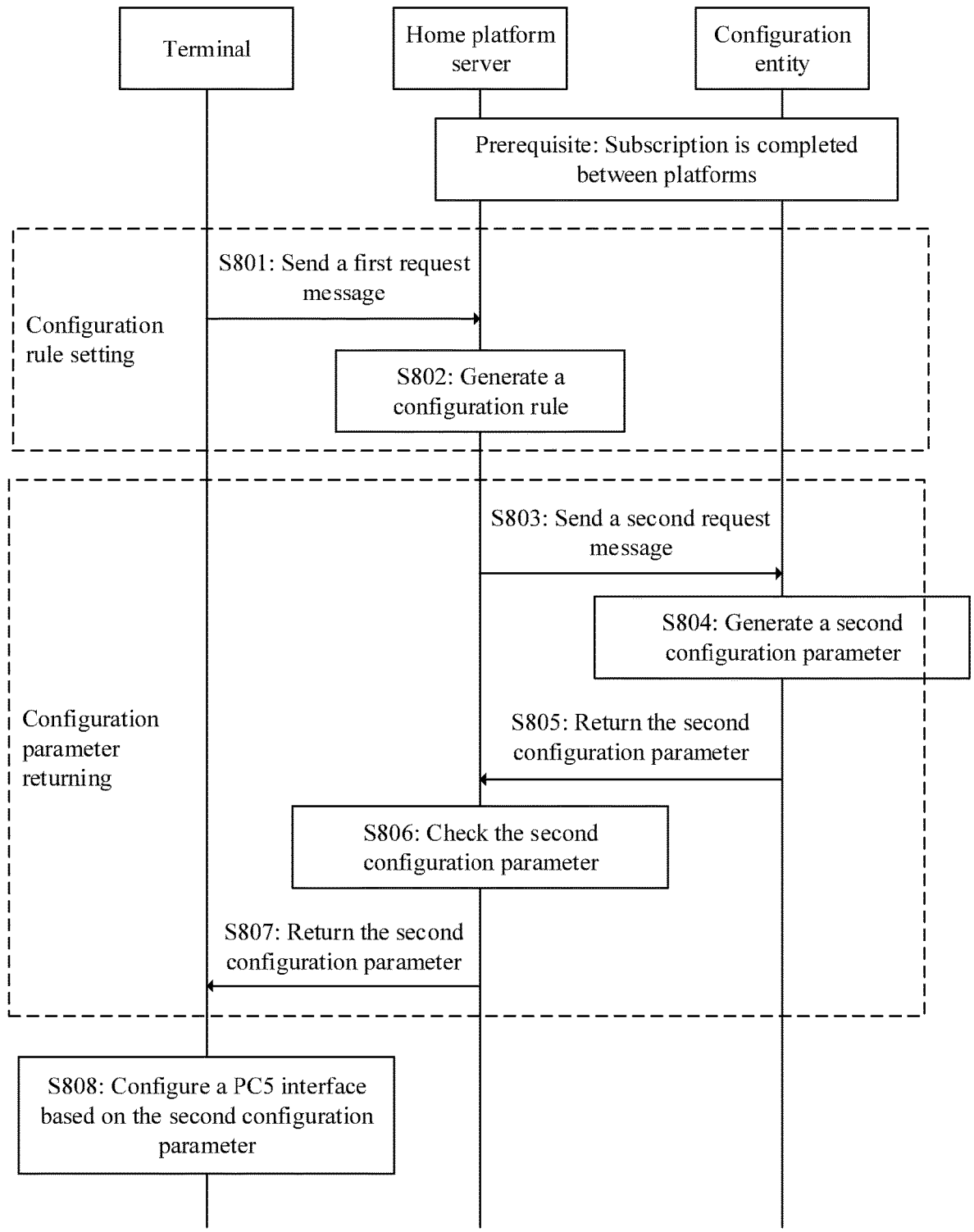
FIG. 8 is a schematic flowchart 4 of a PC5 parameter configuration method according to an embodiment.

Optionally, as shown in FIG. 8, the configuration entity performs the steps shown in FIG. 5. In other words, the configuration entity summarizes the first configuration parameters and generates the second configuration parameter. FIG. 8 is a schematic flowchart of the method, and the method includes the following steps.

S801 to S803 are the same as S601 to S603, and details are not described herein again.

S804: The configuration entity receives first configuration parameters of other configuration entities and generates a second configuration parameter.

In S803, the home platform server sends the second request message to each of a plurality of configuration entities, to request the first configuration parameters of the terminal. The plurality of configuration entities send the generated first configuration parameters to a selected configuration entity, and the selected configuration entity summarizes the received first configuration parameters according to the configuration rule and generates the second configuration parameter.

For example, in the V2X network architecture in FIG. 3, the regional V2X platform is used as a basic data platform in a region, is responsible for planning parameter configuration of the PC5 interface of the terminal in the region, and can communicate with a configuration entity of each operator. Therefore, the regional V2X platform may be selected to summarize the first configuration parameters, the other configuration entities (such as the V2X CF and the eNB) send the generated first configuration parameters to the regional V2X platform, and the regional V2X platform summarizes the received first configuration parameters according to the configuration rule. If the regional V2X platform also generates a first configuration parameter, the regional V2X platform also adds the first configuration parameter generated by the regional V2X platform into summarization, and generates a second configuration parameter.

If only the selected configuration entity generates a first configuration parameter, in this case, the selected configuration entity may directly set the generated first configuration parameter as a second configuration parameter.

S805: The regional V2X platform sends the second configuration parameter to the home platform server.

S806: The home platform server verifies validity of the received second configuration parameter.

The home platform server checks, according to the configuration rule, whether the received second configuration parameter complies with stipulation of the configuration rule, whether each configuration entity exceeds the configuration permission, and the like. If the home platform server finds that the second configuration parameter does not comply with the stipulation of the configuration rule, the home platform server may return a configuration failure message to the configuration entity.

S807: The home platform server sends the second configuration parameter to the terminal.

S808: The terminal configures the PC5 interface based on the received second configuration parameter.

In some V2X networks, a configuration entity may be located at a key node. For example, the configuration entity may be connected to other configuration entities, or messages sent by the other configuration entities need to be forwarded or summarized by the configuration entity. The method shown in FIG. 8 may be applicable to the foregoing network architecture. The configuration entity located at the key node may be selected to summarize first configuration parameters generated by the other configuration entities and generate the second configuration parameter. In this way, a feature of the network architecture may be fully used, and efficiency of generating the second configuration parameter is improved.

Optionally, the method shown in FIG. 8 and the method shown in FIG. 7A and FIG. 7B may be combined into another solution. In the new solution, the home platform server sends the configuration rule to the terminal. In this case, after generating the second configuration parameter, the configuration entities may directly send the second configuration parameters to the terminal, and the terminal checks validity of the second configuration parameter. If the second configuration parameter complies with the configuration rule, the terminal configures the PC5 interface based on the second configuration parameter. If the second configuration parameter does not comply with the configuration rule, the terminal may send the configuration failure message to the selected configuration entity.

It should be noted that the PC5 interface parameter configuration method shown in FIG. 8 may also be applicable to a scenario in which the terminal updates the configuration parameter of the PC5 interface. To be specific, when the terminal updates the PC5 configuration parameter, a configuration entity may also be selected to summarize the first configuration parameters and generate the second configuration parameter, and send the generated second configuration parameter to the home platform server or the terminal for check.

Figure 9A:
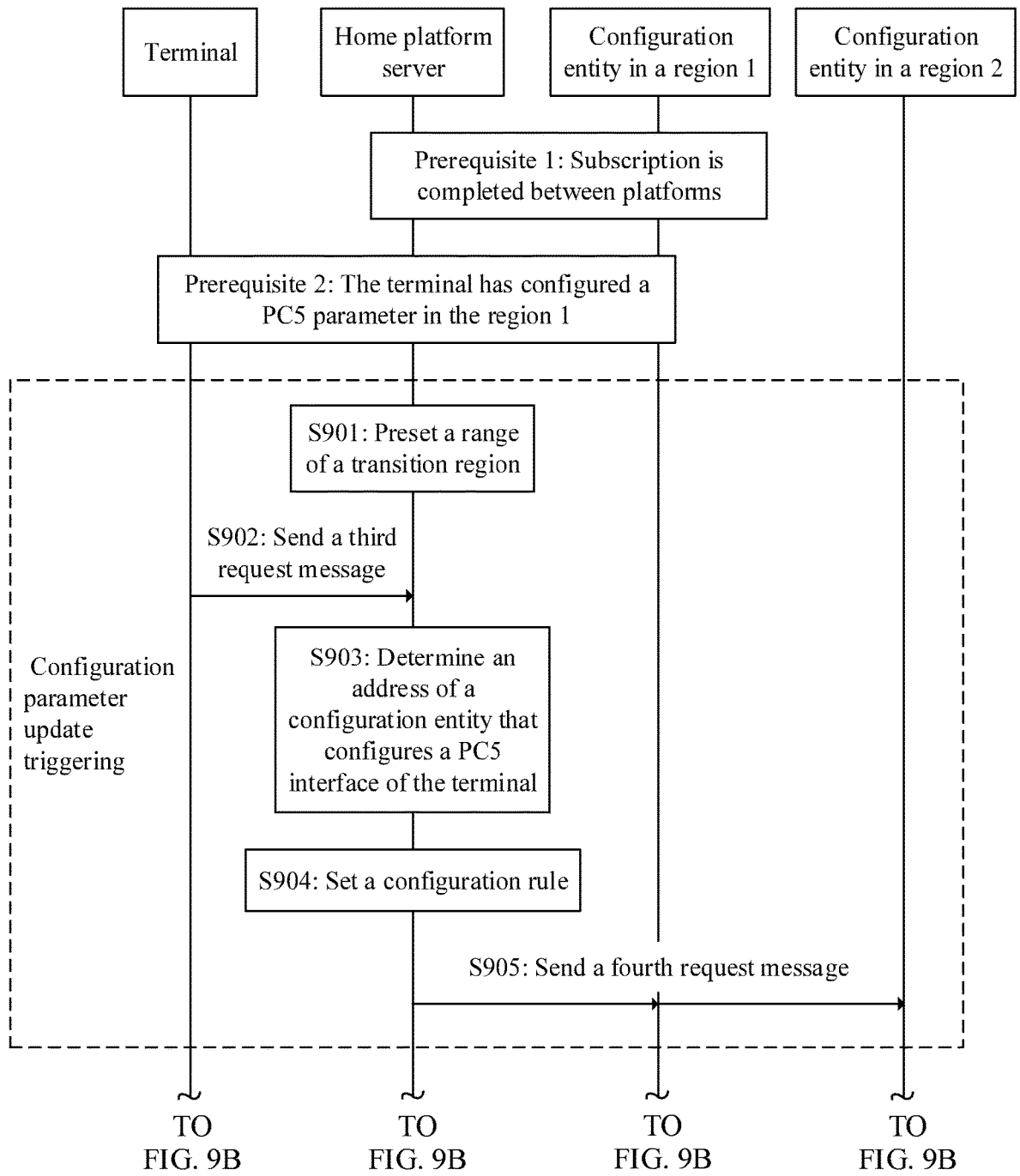
FIG. 9A and FIG. 9B are a schematic flowchart 1 of a method for updating a PC5 parameter when a terminal switches between regions according to an embodiment.
Figure 9B:
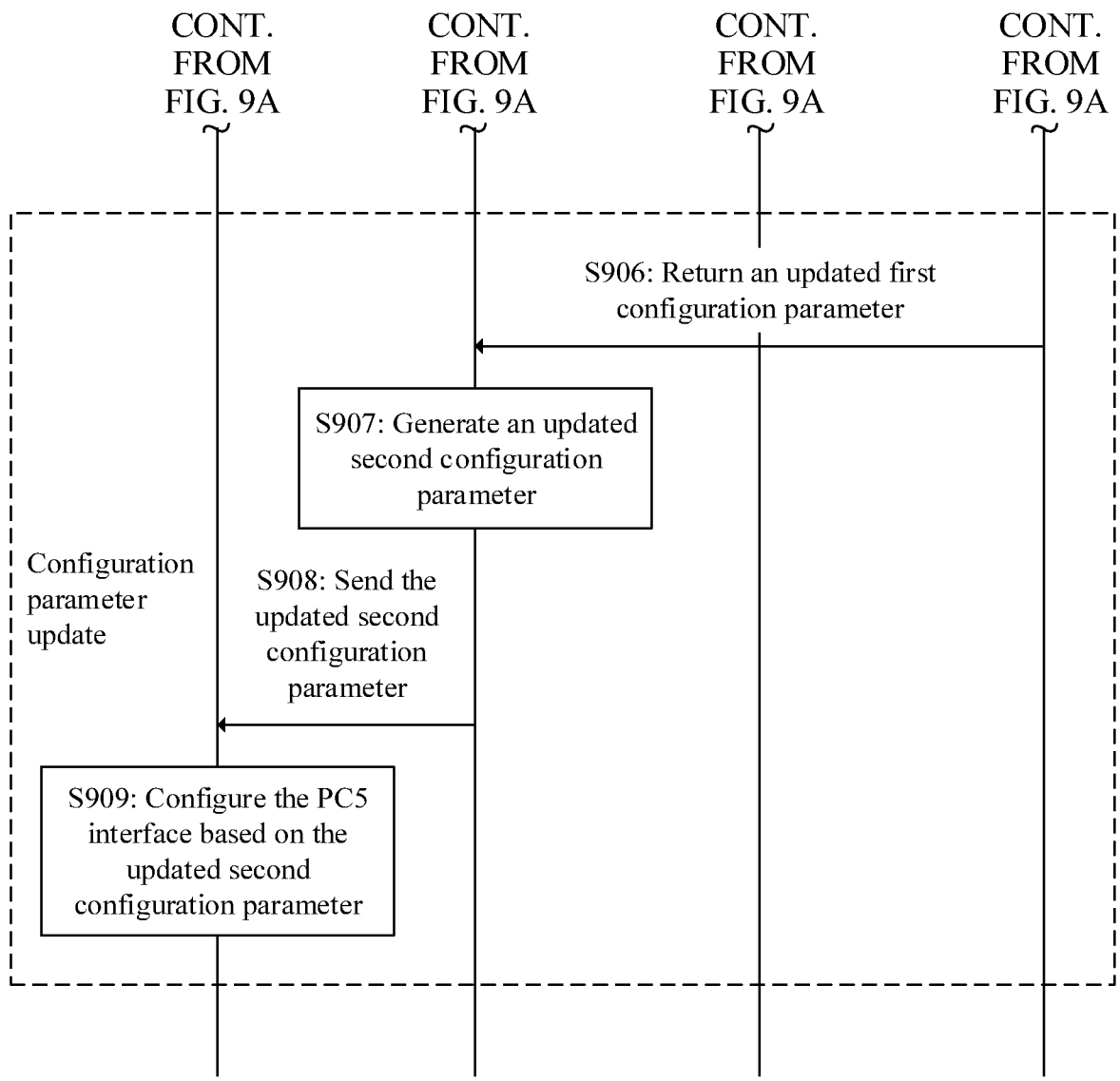

FIG. 5 to FIG. 8 show procedures of obtaining and updating the configuration parameter of the PC5 interface when the terminal enters a region. In some scenarios, after the terminal (for example, a vehicle) configures the parameter of the PC5 interface, the terminal may run across a plurality of regions. During cross-region running, as a special PC5 interface configuration parameter update scenario, the terminal needs to update the configuration parameter of the PC5 interface. FIG. 9A and FIG. 9B show a method for updating a parameter of a PC5 interface when a terminal crosses regions according to an embodiment. FIG. 9A and FIG. 9B are a schematic flowchart of updating the parameter of the PC5 interface when the terminal runs from a region 1 to a region 2, involve interaction between the terminal, a home platform server, a regional V2X platform in the region 1, a regional V2X platform in the region 2, and operator network capability exposure entities, and include the following steps.

S901: The home platform server presets a range of a transition region.

The home platform server presets a range of a transition region between adjacent regions based on service coverage and signal quality of configuration entities in different regions. In this embodiment, the region 1 and the region 2 are used as examples. It should be noted that the region 1 and the region 2 herein are merely examples for description, and do not specifically refer to specific regions.

Optionally, the home platform server may obtain network coverage information of each region provided by the network exposure entity, and refresh the range of the transition region based on network coverage. If there is no network in the original transition region, resulting in a failure of delivering a configuration parameter to the terminal, the transition region needs to be expanded to a range that a network covers. The network coverage information may specifically include coverage and location information of a Uu signal.

S902: The terminal sends a third request message to the home platform server.

The third request message is used to request to update the configuration parameter when the terminal switches between the regions, and the third request message may carry a device ID, a service list, location information, and the like.

The terminal reports the location information, including the device ID and the location information, to the home platform server.

In an implementation, the terminal may report the location information to the home platform server in a specific period. After receiving the location information reported by the terminal, the home platform server determines whether the terminal is in the transition region. If the terminal is in the transition region, the home platform server notifies the terminal of updating the configuration parameter. In this case, the terminal sends the third request message to the home platform server.

Optionally, the home platform server may send the transition region to the terminal, and when determining that the transition region is reached, the terminal automatically triggers a configuration parameter update procedure. In this case, the terminal sends the third request message to the home platform server, and the third request message includes the location information, and then reports the location information to the home platform server.

Optionally, in an implementation, in S902, the terminal may select not to send the third request message, but only report the location information to the home platform. When the home platform server determines that the terminal is in the transition region, the home platform server may directly initiate a configuration parameter update procedure without notifying the terminal of updating the configuration parameter. Specifically, when the home platform server determines that the terminal is in the transition region, the home platform server may directly determine, based on the location information sent by the terminal, an address of a regional V2X platform on which the parameter of the PC5 interface of the terminal is configured in a region corresponding to the location information. In other words, the home platform server directly performs S905.

S903: The home platform server determines, based on the location information carried in the third request message sent by the terminal, an address of a configuration entity that configures the parameter of the PC5 interface of the terminal in the region corresponding to the location information.

The home platform server may determine, based on the location information of the terminal, the transition region in which the terminal is located, and the home platform server stores the transition region and an adjacent region corresponding to each transition region. Therefore, the home platform server may determine two adjacent regions based on the transition region in which the terminal is located, and obtain, through query, addresses of configuration entities corresponding to the two adjacent regions.

S904: The home platform server sets a configuration rule for the parameter of the PC5 interface of the terminal.

A configuration rule in the transition region is to summarize first configuration parameters sent by configuration entities in the region 1 and the region 2, and generate a second configuration parameter applicable to the transition region. After configuring the PC5 interface based on the second configuration parameters the terminal can simultaneously perform, in the transition region, V2X communication with devices in the region 1 and the region 2.

Optionally, when the terminal is in the transition region, the configuration rule may be set that the second configuration parameter generated by combining the first configuration parameters include two groups of configuration parameters. The two groups of configuration parameters are respectively configuration parameters in the transition region and configuration parameters in the region 2. The configuration parameters in the transition region may enable the terminal to simultaneously receive V2X service messages in the region 1 and the region 2, and the configuration parameters in the region 2 may enable the terminal to receive only a V2X service message in the region 2. In this way, the terminal may configure the PC5 interface separately by using different configuration parameters in the transition region and the region 2 that the terminal enters from the transition region.

S905: The home platform server sends a fourth request message to the configuration entities in the region 1 and the region 2.

The fourth request message is used to request the configuration parameter of the PC5 interface of the terminal from the configuration entities in the region 1 and the region 2.

Optionally, the fourth request message may include the configuration rule generated by the home platform server.

S906: The configuration entities in the region 1 and the region 2 send updated first configuration parameters to the home platform server.

It should be noted that, when the terminal runs across the regions, because the terminal runs from the region 1 to the region 2, in this case, the configuration entity in the region 1 may generate the first configuration parameter again according to the request, while the configuration entity in the region 2 may generate the first configuration parameter for the first time according to the request. The first configuration parameter generated by the configuration entity in the region 1 and the first configuration parameter generated by the configuration entity in the region 2 are collectively referred to as the updated first configuration parameter.

S907: The home platform server combines the updated first configuration parameters according to the configuration rule, and generates an updated second configuration parameter.

The updated second configuration parameter is a configuration parameter used by the terminal in the transition region. After configuring the PC5 interface based on the updated second configuration parameter, the terminal can simultaneously perform, in the transition region, V2X communication with the devices in the region 1 and the region 2.

Optionally, the updated second configuration parameter may include two groups of configuration parameters, and the two groups of configuration parameters are respectively the configuration parameters in the transition region and the configuration parameters in the region 2. The configuration parameters in the transition region may enable the terminal to simultaneously receive the V2X service messages in the region 1 and the region 2, and the configuration parameter in the region 2 may enable the terminal to receive only the V2X service message in the region 2. In this way, the terminal may configure the PC5 interface separately by using different configuration parameters in the transition region and the region 2 that the terminal enters from the transition region.

A specific method for combining the updated first configuration parameters and generating the updated second configuration parameter by the home platform server has been described in S605 in FIG. 6A and FIG. 6B, and details are not described herein again.

S908: The home platform server sends the updated second configuration parameter to the terminal.

According to the configuration rule described above, the second configuration parameter sent by the home platform server to the terminal may include two groups of parameters: the configuration parameters corresponding to the transition region and the configuration parameters corresponding to the region 2.

S909: The terminal configures the PC5 interface based on the updated second configuration parameter.

After receiving a message that is for updating the second configuration parameter and that is sent by the home platform server, the terminal determines, based on location coordinates of the terminal, a location region in which the terminal is located, and then selects, based on the location region in which the terminal is located, a corresponding configuration parameter to configure the PC5 interface for communication.

It should be noted that, before the terminal executes the foregoing procedure, subscription between platforms is completed, including that the home platform server has completed subscription with the configuration entity in the region 1 and the configuration entity in the region 2, and the home platform server has completed subscription with an operator network capability exposure entity in each region. The operator network capability exposure entity may be a service capability exposure function (SCEF), an MB-SC, a RAN congestion awareness function (RCAF), or the like. Different operators using different network architectures may have different operator network capability exposure entities. This is not limited in this embodiment.

The foregoing embodiment describes a procedure of updating the configuration parameter of the PC5 interface of the terminal when the terminal runs across the regions. The home platform server sets a transition region near a boundary of two regions. When the terminal enters the transition region, a PC5 configuration parameter update process is triggered, and a configuration parameter update request message is sent to the home platform server. The home platform server sets a combination rule for the transition region, summarizes the configuration parameters according to the configuration rule, and selects different configuration parameters based on different location regions. The terminal selects the corresponding configuration parameters based on the location. In the method for updating configuration parameters across regions provided in this embodiment, the transition region is set by the home platform server, and the PC5 configuration parameter update procedure is triggered when the terminal enters the transition region. In this way, the terminal can update the PC5 configuration parameter in time. This resolves a problem of across-region PC5 communication interworking, and prevents PC5 communication interruption when the terminal runs across regions.

Figure 10A:
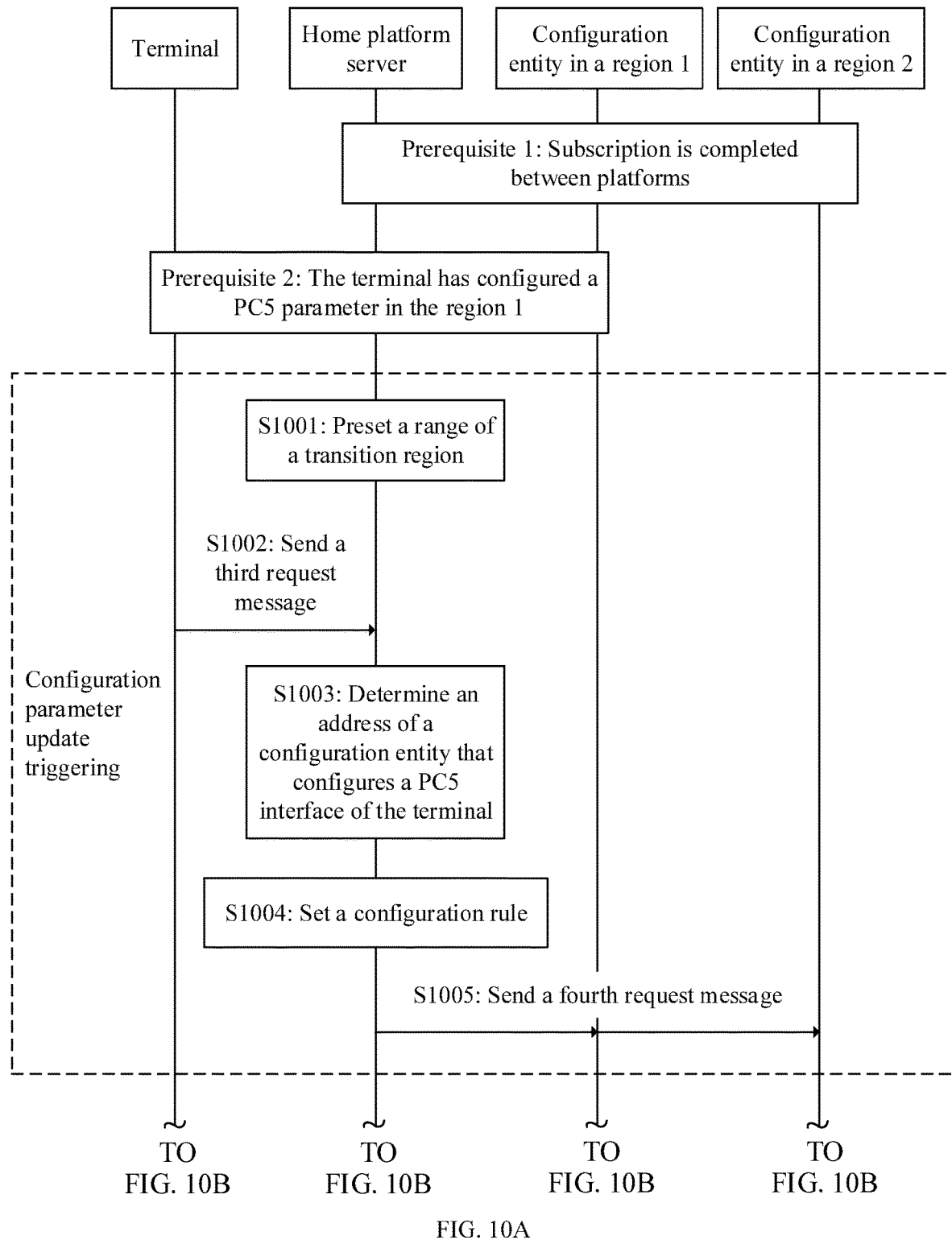
FIG. 10A and FIG. 10B are a schematic flowchart 2 of a method for updating a PC5 parameter when a terminal switches between regions according to an embodiment.
Figure 10B:
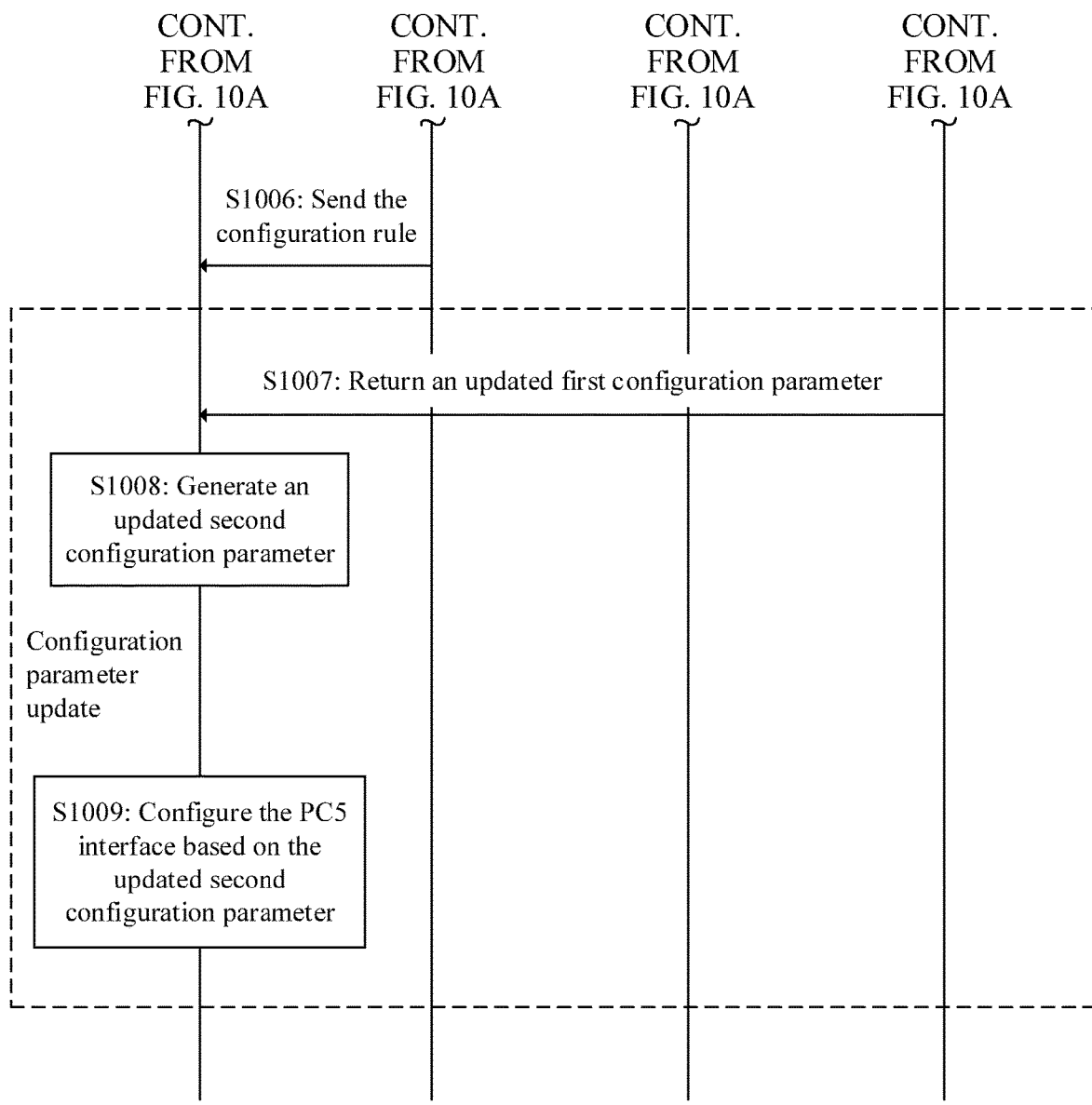

In another implementation, after generating the configuration rule for the transition region, the home platform server may send the configuration rule to the terminal, so that the terminal may automatically summarize the received configuration parameters that are for the PC5 interfaces and that are sent by the configuration entities, and select, based on the location in which the terminal is located, the configuration parameter used to configure the PC5 interface of the terminal. FIG. 10A and FIG. 10B are a schematic flowchart of the foregoing solution, including the following steps.

S1001 to S1005 are the same as S901 to S905. For details, refer to the embodiment shown in FIG. 9A and FIG. 9B. Details are not described herein again.

S1006: The home platform server sends the configuration rule to the terminal.

The home platform server sends the configuration rule generated in S1004 to the terminal, so that the terminal may summarize, according to the configuration rule, the first configuration parameters returned by the configuration entities.

It should be noted that a sequence of S1006 is not limited in this embodiment. The home platform server may send the configuration rule to the terminal immediately after generating the configuration rule. In other words, S1006 may follow S1004.

S1007: The configuration entities in the region 1 and the region 2 send updated first configuration parameters to the terminal.

In this embodiment, the home platform server may specify, in the second request message sent to the configuration entity, that each configuration entity directly sends the generated first configuration parameter to a corresponding terminal, or may forward the received first configuration parameter to the terminal after receiving the first configuration parameter generated by each configuration entity.

It should be noted that, when the terminal runs across the regions, because the terminal runs from the region 1 to the region 2, in this case, the configuration entity in the region 1 may generate the first configuration parameter again according to the request, while the configuration entity in the region 2 may generate the first configuration parameter for the first time according to the request. The first configuration parameter generated by the configuration entity in the region 1 and the first configuration parameter generated by the configuration entity in the region 2 are collectively referred to as the updated first configuration parameter.

S1008: The terminal combines the updated first configuration parameters according to the configuration rule, and generates an updated second configuration parameter.

The updated second configuration parameter is a configuration parameter used by the terminal in the transition region. After configuring the PC5 interface based on the updated second configuration parameter, the terminal can simultaneously perform, in the transition region, V2X communication with the devices in the region 1 and the region 2.

Optionally, the updated second configuration parameter may include two groups of configuration parameters, and the two groups of configuration parameters are respectively the configuration parameters in the transition region and the configuration parameters in the region 2. The configuration parameters in the transition region may enable the terminal to simultaneously receive the V2X service messages in the region 1 and the region 2, and the configuration parameter in the region 2 may enable the terminal to receive only the V2X service message in the region 2. In this way, the terminal may configure the PC5 interface separately by using different configuration parameters in the transition region and the region 2 that the terminal enters from the transition region.

An implementation in which the terminal combines the updated first configuration parameters and generates the updated second configuration parameter is described in S706 in FIG. 7A and FIG. 7B, and details are not described herein again.

S1009: The terminal configures the PC5 interface based on the updated second configuration parameter.

After receiving the first configuration parameters, the terminal determines, based on location coordinates of the terminal, a location region in which the terminal is located, and then selects, based on the location region in which the terminal is located, a corresponding configuration parameter to configure the PC5 interface for communication.

Different from the embodiment shown in FIG. 9A and FIG. 9B, in the embodiment shown in FIG. 10A and FIG. 10B, the home platform server sends the configuration rule to the terminal, and the terminal generates the updated second configuration parameter according to the configuration rule, and then determines the used configuration parameter based on the location information of the terminal. The regional V2X platform in the region 2 directly sends configuration parameters to the terminal, and then the terminal determines, based on the received configuration parameters, a final configuration parameter used for the PC5 interface. In this way, processing time can be reduced, and a time for updating the PC5 parameter of the terminal can be increased.

Figure 11:
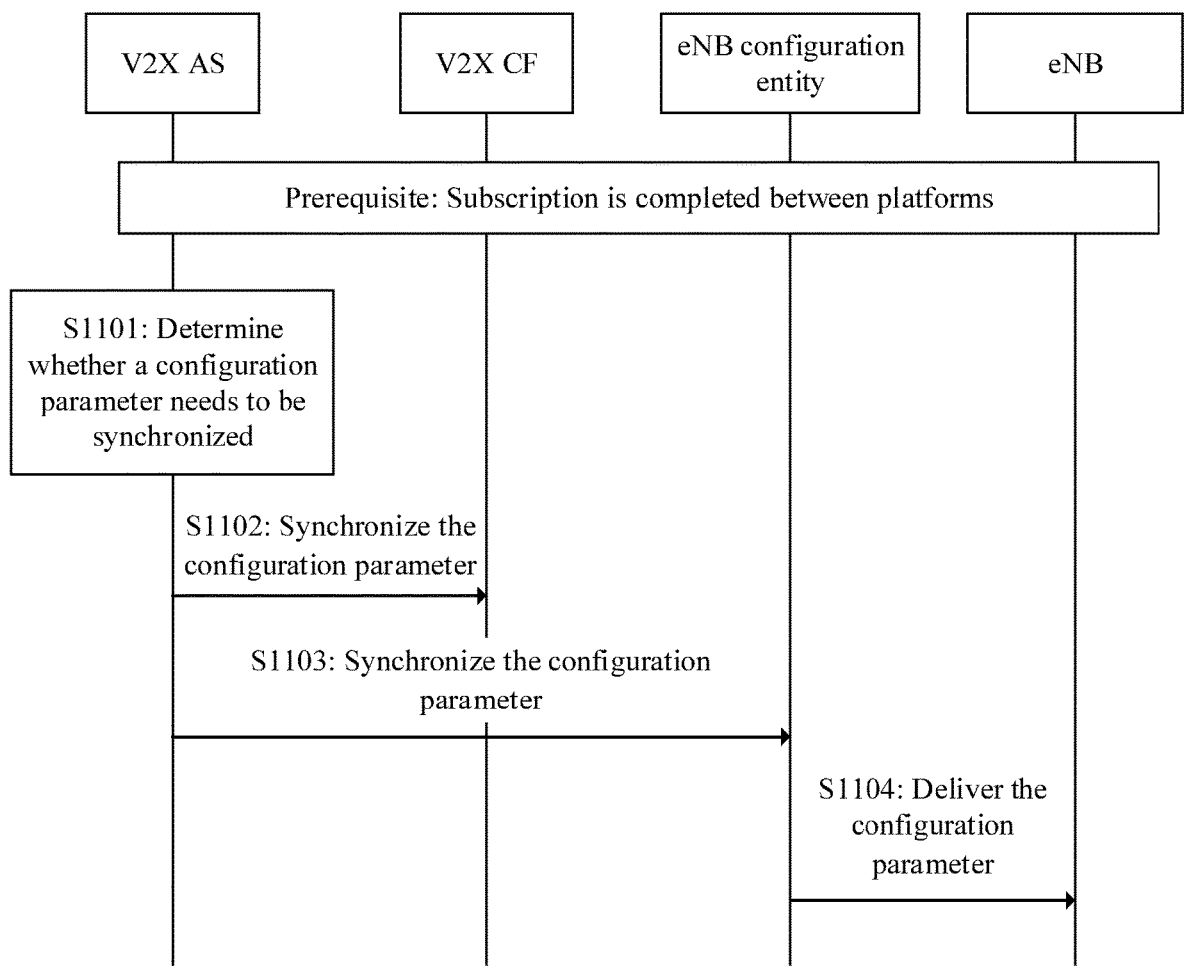
FIG. 11 is a schematic flowchart of a method for synchronizing PC5 parameters between configuration entities according to an embodiment.

When a V2X CF and an eNB of an operator participate in configuring the PC5 parameter as configuration entities, the configuration parameters of the configuration entities need to be synchronized to ensure coordination between the configuration entities. The regional V2X platform has global V2X service information in a region and can properly allocate PC5 resources based on a service and geographical location information. The regional V2X platform is a source of PC5 parameter configuration. When the terminal is controlled by the operator and the PC5 parameter is configured by a configuration entity of the operator, a mechanism for synchronizing the configuration parameters of the regional V2X platform to management entities of the V2X CF and the eNB needs to be provided. FIG. 11 is a schematic flowchart of the foregoing solution, including the following steps.

S1101: The regional V2X platform determines whether PC5 parameters need to be synchronized.

Specifically, the regional V2X platform may determine, according to the configuration rule set by the home platform server, whether the configuration entity of the operator participates in configuring the PC5 parameter. If the configuration entity of the operator exists, a configuration synchronization determining procedure is triggered. The parameters to be synchronized are related to a configuration rule setting. If the V2X CF configures all of the parameters, the regional V2X platform needs to synchronize all configuration information to the V2X CF. If the V2X CF performs only enhanced configuration of a radio parameter, the regional V2X platform needs to send a basic radio parameter to the V2X CF. If the eNB performs parameter configuration during network coverage, the regional V2X platform needs to synchronize a radio configuration parameter to the management entity of the eNB. The configuration entity of the operator can optimize a network parameter and improve communication quality when communication is ensured.

The management entity of the eNB is configured to manage the eNB, and may have different representation forms in different networks. The management entity of the eNB may be disposed independently, or may be integrated in an existing device. For example, the management entity of the eNB may be another management network element that is for base station configuration and that is newly added to a network management device, the V2X CF, the regional V2X platform, or a 5G network and a later network. This is not limited in this embodiment.

S1102: The regional V2X platform sends a configuration synchronization message to the V2X CF.

The regional V2X platform can synchronize the configuration parameters to the V2X CF in the following manners. In Manner 1, the regional V2X platform performs synchronization based on configuration parameters of the terminal, carrying a terminal identifier and the configuration parameters. In Manner 2, the regional V2X platform synchronizes service type-based service configuration and region-based configuration parameters to the V2X CF. After receiving a configuration request from the terminal, the V2X CF generates the configuration parameters of the terminal based on a terminal service.

S1103: The regional V2X platform sends radio parameter configuration data to the management entity of the eNB.

The radio configuration parameter is a radio parameter defined in the TS 36.331, and includes a resource pool, a resource selection policy, a resource congestion policy, and the like.

S1104: The management entity of the eNB delivers the configuration parameter of the PC5 interface to the eNB.

The management entity of the eNB determines PC5 parameter configuration in different coverage regions of the eNB, and delivers PC5 parameter configuration data to the eNB. The eNB performs PC5 parameter configuration and resource scheduling of the terminal based on globally coordinated PC5 configuration parameters, so that a resource policy can be set on the premise of ensuring communication, to improve communication quality.

By setting the foregoing configuration parameter synchronization mechanism, the regional V2X platform may synchronize the configuration parameters to the configuration entity of the operator based on a requirement. After obtaining the configuration parameters of the regional V2X platform, the configuration entity of the operator may more specifically configure the parameter of the PC5 interface according to a request of the terminal, so that parameter configuration is more efficient, and configuration parameter coordination between configuration entities can be implemented.

The foregoing embodiments mainly describe the solutions provided in the embodiments from a perspective of interaction between network elements. It may be understood that, to implement the foregoing functions, each of the terminal, the home platform server, and the configuration entity includes a corresponding hardware structure and/or software module for performing each function. A person skilled in the art should be easily aware that, the units and the algorithm steps in the examples described with reference to the embodiments disclosed in this specification can be performed by hardware or a combination of hardware and computer software. This depends on particular applications and design constraints of the technical solutions. A person skilled in the art may use different methods to implement the described functions for each particular application, but it should not be considered that the implementation goes beyond the scope of the present disclosure.

In the embodiments, division into the functional modules may be performed on the terminal, the home platform server, and the configuration entity based on the foregoing method examples. For example, functional modules may be obtained through division based on functions, or two or more functions may be integrated in one processing module. The integrated module may be implemented in a form of hardware, or may be implemented in a form of a software functional module. It should be noted that, in the embodiments of the present disclosure, division into the modules is an example, and is merely logical function division. In actual implementation, another division manner may be used.

Figure 12:
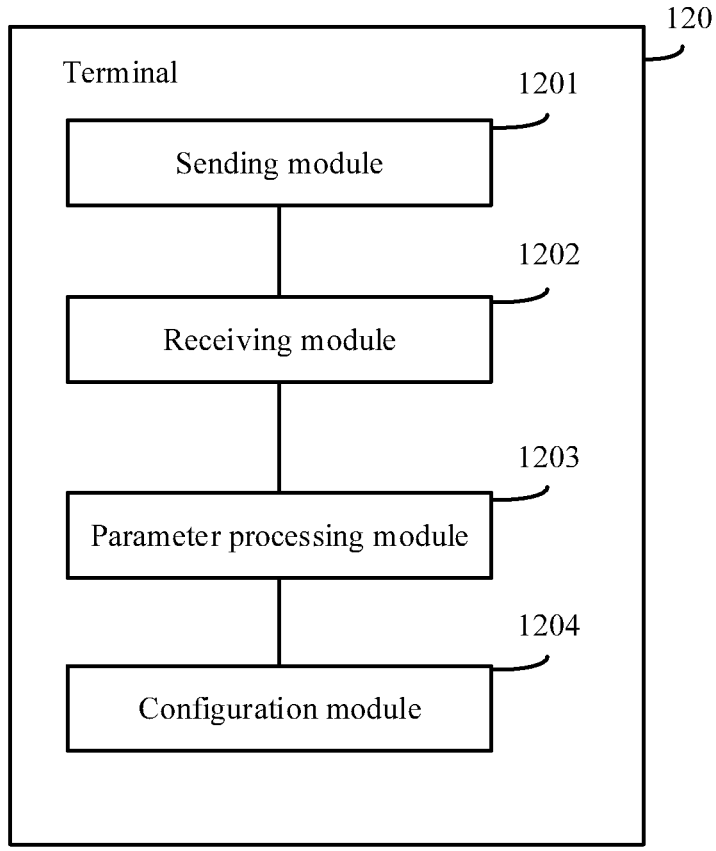
FIG. 12 is a schematic structural diagram 1 of a terminal according to an embodiment.

For example, when the functional modules are obtained through division based on the corresponding functions, FIG. 12 is a possible schematic structural diagram of the terminal in the foregoing embodiments. A terminal 120 includes a receiving module 1202, a parameter processing module 1203, and a configuration module 1204. The receiving module 1202 is configured to receive first configuration parameters generated by configuration entities. The parameter processing module 1203 is configured to summarize the first configuration parameters according to a configuration rule, and generate a second configuration parameter. The configuration module 1204 is configured to configure a PC5 interface based on the second configuration parameter.

A first request message may carry information such as a terminal identifier or a device ID, a supported service list or a service ID, and location information. Each configuration entity that configures a parameter of the PC5 interface may deliver a corresponding PC5 configuration parameter to the terminal based on the information carried in the first request message. The location information is a location region in which the terminal performs communication through the PC5 interface, and may be identified as an administrative region, for example, the Wuxi city or the Shanghai city, or may be geographical location coordinates, such as polygon information enclosed by a series of longitude and latitude coordinates identified by GPS.

Optionally, the first request message may further include HPLMN information, and a home platform server may query a corresponding configuration entity based on the HPLMN information of the terminal.

The receiving module 1202 of the terminal 120 is further configured to receive the configuration rule generated by the home platform server. The configuration rule is used to summarize the first configuration parameters generated by the configuration entities and generate the second configuration parameter. The configuration rule includes a configuration entity identifier, configuration permission, and a configuration priority.

The terminal 120 may obtain, in two manners, the first configuration parameters generated by the configuration entities. The terminal 120 further includes a sending module 1201 configured to send the first request message to the home platform server. The first request message is used to request the configuration parameter of the PC5 interface of the terminal. The receiving module 1202 is configured to receive the first configuration parameters that are generated by the configuration entities and sent by the home platform server. Alternatively, the sending module 1201 of the terminal 120 is configured to send a second request message to each of the configuration entities, where the second request message is used to obtain the first configuration parameters generated by the configuration entities. The receiving module 1202 is configured to receive the first configuration parameters generated by the configuration entities.

In another implementation, the receiving module 1202 in the terminal 120 may be configured to receive the configuration rule generated by the home platform server and a second configuration parameter generated by the configuration entity. The parameter processing module 1203 is configured to check the second configuration parameter according to the configuration rule. The configuration module 1204 is configured to configure the PC5 interface based on the second configuration parameter.

The second configuration parameter is generated by combining the first configuration parameters according to the configuration rule, and is a parameter used to configure the PC5 interface of the terminal.

Optionally, when the configuration parameter needs to be updated, the sending module 1201 may be further configured to send a third request message to the home platform server. The third request message is used to request the home platform server to update the configuration parameter. The sending module 1201 may be further configured to send a fourth request message to each of the configuration entities, where the fourth request message is used to request the configuration entities to update the configuration parameters. After the terminal 120 initiates a parameter update request, the receiving module is further configured to receive updated first configuration parameters generated by the configuration entities, and the parameter processing module is further configured to summarize the updated first configuration parameters according to the configuration rule, and generate an updated second configuration parameter.

The third request message and the fourth request message each carry a device identifier of the terminal and the configuration parameters requested to be updated.

Optionally, the terminal 120 may request to update some configuration parameters in the configuration parameters.

Optionally, when the terminal 120 needs to switch between regions, the sending module 1201 may send the third request message to the home platform server, to request to update the configuration parameter when the terminal 120 switches between the regions. The third request message may carry a subscriber identifier, a service list, and location information. The second configuration parameter updated when the terminal 120 switches between the regions may include a plurality of groups of configuration parameters used to configure the PC5 interface in different regions.

Optionally, when the terminal 120 needs to switch between the regions, the sending module 1201 may be further configured to send location information of the terminal to the home platform server.

All related content of the steps in the foregoing method embodiments may be cited in function descriptions of corresponding functional modules. Details are not described herein again.

Figure 13:
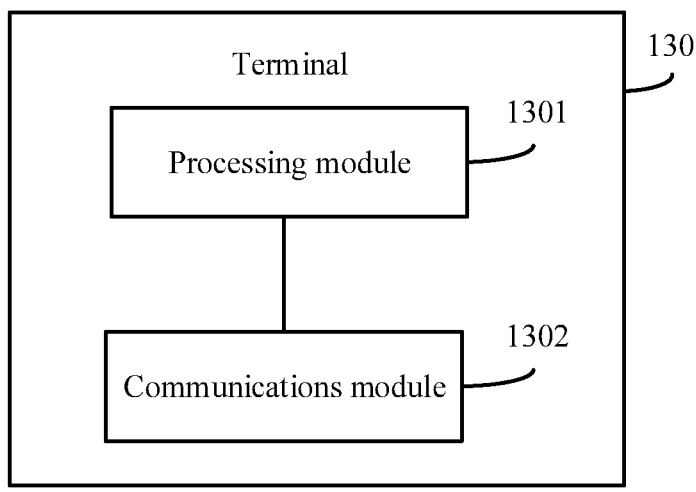
FIG. 13 is a schematic structural diagram 2 of a terminal according to an embodiment.

When the functional modules are obtained through division in an integrated manner, FIG. 13 is a possible schematic structural diagram of the terminal in the foregoing embodiments. A terminal 130 includes a processing module 1301 and a communications module 1302. The processing module 1301 may perform operations that can be performed by the parameter processing module 1203 and the configuration module 1204 in FIG. 12. The communications module 1302 may be configured to perform operations that can be performed by the sending module 1201 and the receiving module 1202 in FIG. 12. For details, refer to the embodiment shown in FIG. 10A and FIG. 10B. Details are not described again in this embodiment.

All related content of the steps in the foregoing method embodiments may be cited in function descriptions of corresponding functional modules. Details are not described herein again.

In this embodiment, the terminal is presented in a form of corresponding to the functional modules, or the terminal is presented in a form of dividing the functional modules in the integrated manner. The "module" herein may be an ASIC, a processor and a memory that execute one or more software programs or firmware programs, an integrated logic circuit, and/or another component that can provide the foregoing function. In a simple embodiment, a person skilled in the art may figure out that the terminal 120 or the terminal 130 may use the form shown in FIG. 4. For example, the sending module, the receiving module, the parameter processing module, and the configuration module in FIG. 12 are implemented by using the processor and the memory in FIG. 4. Specifically, the sending module, the receiving module, the parameter processing module, and the configuration module may be implemented by the processor by invoking the application program code stored in the memory. This is not limited in this embodiment. Alternatively, for example, the processing module and the communications module in FIG. 13 may be implemented by the processor and the memory in FIG. 4. Specifically, the processing module and the communications module may be implemented by the processor by invoking the application program code stored in the memory. This is not limited in this embodiment.

The terminal provided in this embodiment may be configured to perform the PC5 parameter configuration method. Therefore, for a technical effect that can be obtained by the terminal, refer to the foregoing method embodiments, and details are not described herein again.

Figure 14:
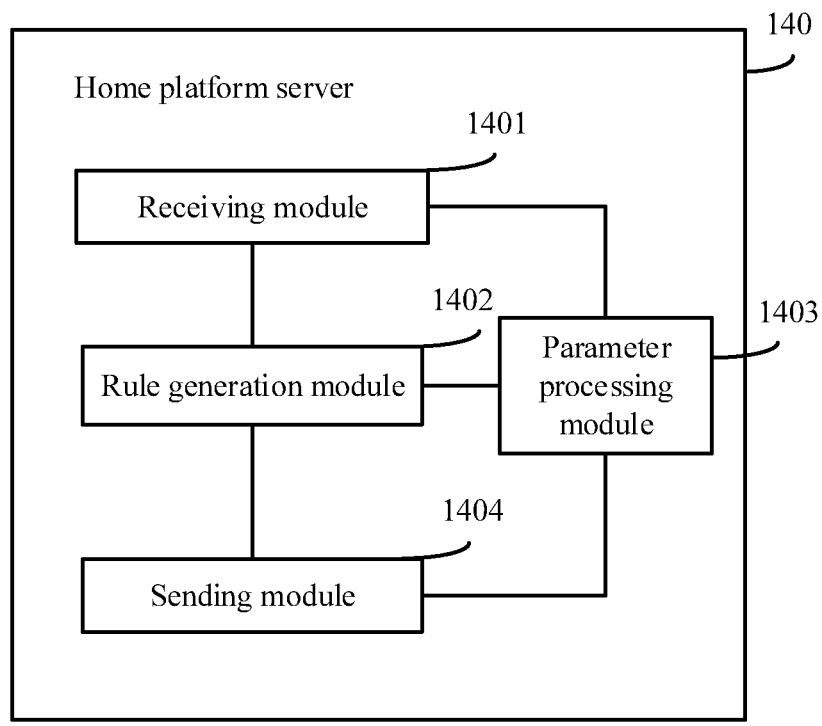
FIG. 14 is a schematic structural diagram 1 of a home platform server according to an embodiment.

For example, when the functional modules are obtained through division based on the corresponding functions, FIG. 14 is a possible schematic structural diagram of the home platform server in the foregoing embodiments. A home platform server 140 includes a receiving module 1401, a parameter processing module 1403, and a sending module 1404. The receiving module 1401 is configured to receive a first request message sent by a terminal. The first request message is used to request a parameter of a PC5 interface of the terminal. The sending module 1404 is configured to send a second request message to each of configuration entities, where the second request message is generated based on the first request message. The receiving module 1401 is further configured to receive first configuration parameters generated by the configuration entities. The parameter processing module 1403 is configured to summarize the first configuration parameters according to a configuration rule, and generate a second configuration parameter. The sending module 1404 is further configured to send the second configuration parameter to the terminal.

The first request message is used by the terminal to request the parameter of the PC5 interface from the home platform server, and the first request message may carry information such as a device identifier or a device ID, a supported service list or a service ID, and location information. Each configuration entity that configures the parameter of the PC5 interface may deliver a corresponding PC5 configuration parameter to the terminal based on the information carried in the first request message. The location information is a location region in which the terminal performs communication through the PC5 interface, and may be identified as an administrative region, for example, the Wuxi City or the Shanghai City, or may be geographical location coordinates, such as polygon information enclosed by a series of longitude and latitude coordinates identified by the GPS.

The home platform server may further include a rule generation module 1402 configured to generate the configuration rule. The configuration rule is used to control the configuration entities to configure the parameters for the PC5 interface of the terminal, summarize the first configuration parameters generated by the configuration entities, and generate the second configuration parameter. The configuration rule may include a configuration entity identifier, configuration permission, and a configuration priority.

In another implementation, the sending module 1404 in the home platform server is configured to send a second request message to each of the configuration entities, where the second request message is generated based on the first request message, and the second request message includes the configuration rule. The receiving module 1401 is further configured to receive a second configuration parameter generated by the configuration entity. The parameter processing module 1403 is configured to check the second configuration parameter according to the configuration rule. The sending module 1404 is further configured to send the second configuration parameter to the terminal.

The second configuration parameter is generated by combining the first configuration parameters according to the configuration rule, and is a parameter used to configure the PC5 interface of the terminal.

Optionally, the receiving module 1401 may be further configured to receive a third request message sent by the terminal. The third request message is used by the terminal to request the home platform server to update the configuration parameter. The sending module 1404 is further configured to send a fourth request message to each of the configuration entities, where the fourth request message is generated based on the third request message. The receiving module 1401 is further configured to receive updated first configuration parameters generated by the configuration entities. The parameter processing module 1403 is configured to summarize the updated first configuration parameters according to the configuration rule, and generate an updated second configuration parameter. The sending module 1404 is further configured to send the updated second configuration parameter to the terminal.

When the terminal switches between regions, the receiving module 1401 is configured to receive the third request message sent by the terminal. The third request message is used to request the home platform server to update the configuration parameter. In this case, the generated second configuration parameter may include a plurality of groups of configuration parameters used to configure the PC5 interface of the terminal in different regions.

Figure 15:
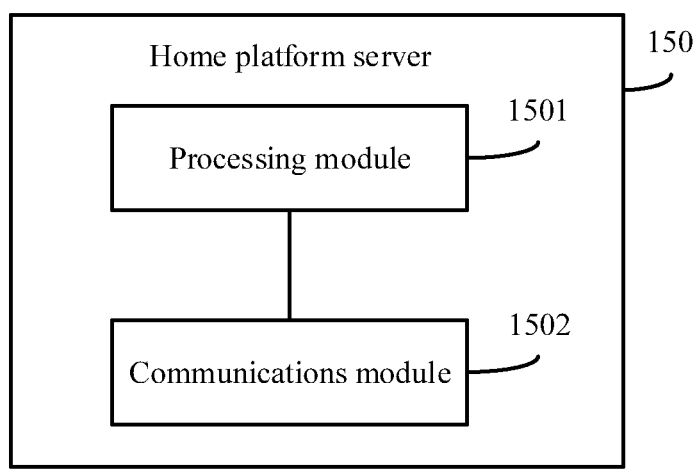
FIG. 15 is a schematic structural diagram 2 of a home platform server according to an embodiment.

When the functional modules are obtained through division in an integrated manner, FIG. 15 is a possible structural form of the home platform server in the foregoing embodiments. A home platform server 150 includes a processing module 1501 and a communications module 1502. The processing module 1501 may perform operations that can be performed by the rule generation module 1402 and the parameter processing module 1403 in FIG. 14. The communications module 1502 may be configured to perform operations that can be performed by the sending module 1404 and the receiving module 1401 in FIG. 14. For details, refer to the embodiment shown in FIG. 14. Details are not described again in this embodiment.

All related content of the steps in the foregoing method embodiments may be cited in function descriptions of corresponding functional modules. Details are not described herein again.

In this embodiment, the terminal is presented in a form of corresponding to the functional modules, or the terminal is presented in a form of dividing the functional modules in the integrated manner. The "module" herein may be an ASIC, a processor and a memory that execute one or more software programs or firmware programs, an integrated logic circuit, and/or another component that can provide the foregoing function. In a simple embodiment, a person skilled in the art may figure out that the home platform server 140 or the home platform server 150 may use the form shown in FIG. 4. For example, the sending module, the receiving module, the rule generation module, and the summarization module in FIG. 14 are implemented by the processor and the memory in FIG. 4. Specifically, the sending module, the receiving module, the rule generation module, and the parameter processing module may be implemented by the processor by invoking the application program code stored in the memory. This is not limited in this embodiment. Alternatively, for example, the processing module and the communications module in FIG. 15 may be implemented by the processor and the memory in FIG. 4. Specifically, the processing module and the communications module may be implemented by the processor by invoking the application program code stored in the memory. This is not limited in this embodiment.

The home platform server provided in this embodiment may be configured to perform the PC5 parameter configuration method. Therefore, for a technical effect that can be achieved by the home platform server, refer to the foregoing method embodiments. Details are not described herein again.

Figure 16:
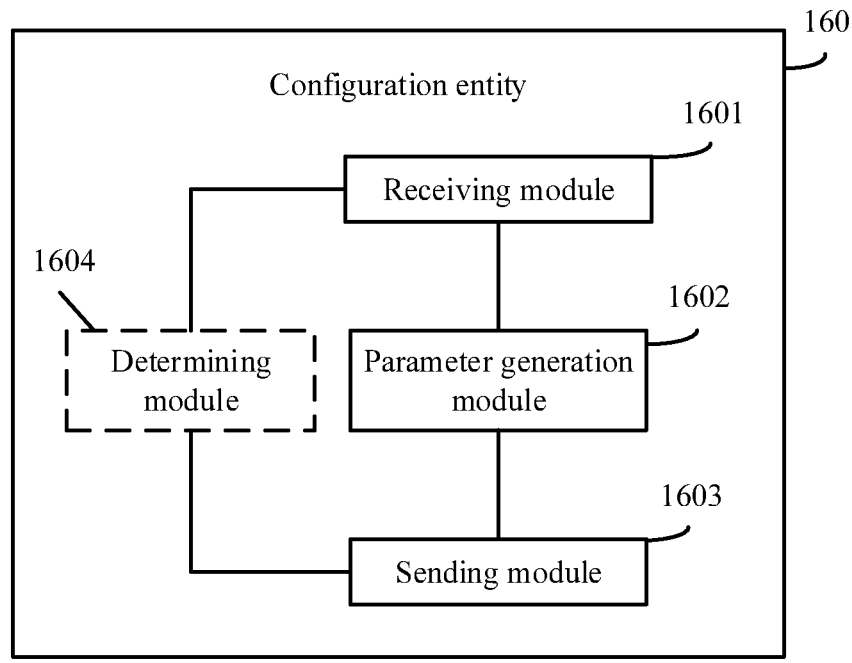
FIG. 16 is a schematic structural diagram 1 of a configuration entity according to an embodiment.

For example, when the functional modules are obtained through division based on the corresponding functions, FIG. 16 is a possible schematic structural diagram of the configuration entity in the foregoing embodiments. A configuration entity 160 includes a receiving module 1601, a parameter generation module 1602, and a sending module 1603. The receiving module 1601 is configured to receive a second request message sent by a home platform server or a terminal. The second request message is used to request a configuration parameter of a PC5 interface of the terminal, and the second request message includes a configuration rule. The parameter generation module 1602 is configured to generate a first configuration parameter. The receiving module 1601 is further configured to receive first configuration parameters sent by other configuration entities. The parameter generation module 1602 is further configured to summarize the received first configuration parameters according to the configuration rule and generate a second configuration parameter. The sending module 1603 is configured to send the second configuration parameter to the terminal or the home platform server.

Optionally, when the parameter of the PC5 interface needs to be updated, the receiving module 1601 is further configured to receive a fourth request message. The fourth request message is used to request the configuration parameter of the PC5 interface of the terminal. The fourth request message may be sent by the terminal, or may be sent by the home platform server. The fourth request message may be used only to request to update at least one of the parameters of the PC5 interface of the terminal.

Optionally, the configuration entity 160 further includes a determining module 1604 configured to determine whether to need to synchronize the configuration parameter with the other configuration entities. The sending module 1603 is further configured to send the configuration parameter to a V2X CF. The sending module 1603 is further configured to send the configuration parameter to a management entity of an eNB.

Figure 17:
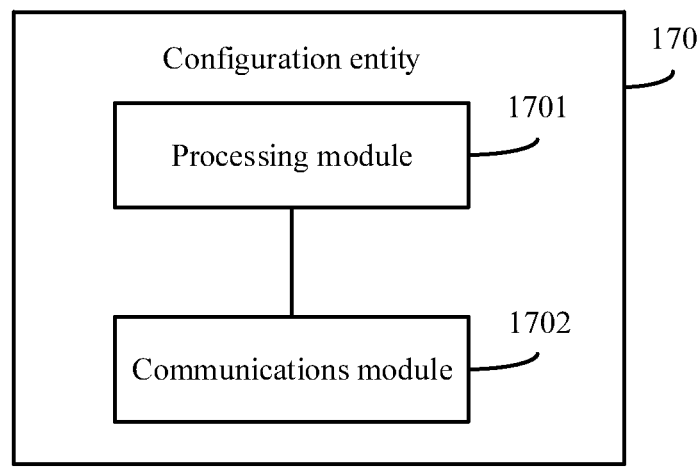
FIG. 17 is a schematic structural diagram 2 of a configuration entity according to an embodiment.

When the functional modules are obtained through division in an integrated manner, FIG. 17 is a possible structural form of the configuration entity 150 in the foregoing embodiments. A configuration entity 170 includes a processing module 1701 and a communications module 1702. The processing module 1701 may perform operations that can be performed by the parameter generation module 1602 and the determining module 1604 in FIG. 16. The communications module 1702 may be configured to perform operations that can be performed by the receiving module 1601 and the sending module 1603 in FIG. 16. For details, refer to the embodiment shown in FIG. 16. Details are not described again in this embodiment.

All related content of the steps in the foregoing method embodiments may be cited in function descriptions of corresponding functional modules. Details are not described herein again.

In this embodiment, the terminal is presented in a form of corresponding to the functional modules, or the terminal is presented in a form of dividing the functional modules in the integrated manner. The "module" herein may be an ASIC, a processor and a memory that execute one or more software programs or firmware programs, an integrated logic circuit, and/or another component that can provide the foregoing function. In a simple embodiment, a person skilled in the art may figure out that the configuration entity 160 or the configuration entity 170 may use the form shown in FIG. 4. For example, the receiving module, the parameter generation module, the sending module, and the determining module in FIG. 16 are implemented by the processor and the memory in FIG. 4. Specifically, the receiving module, the parameter generation module, the sending module, and the determining module may be implemented by the processor by invoking the application program code stored in the memory. This is not limited in this embodiment. Alternatively, for example, the processing module 1701 and the communications module 1702 in FIG. 17 may be implemented by the processor and the memory in FIG. 4. Specifically, the processing module and the communications module may be implemented by the processor by invoking the application program code stored in the memory. This is not limited in this embodiment.

Because the configuration entity provided in this embodiment may be configured to perform the PC5 parameter configuration method, for a technical effect that can be obtained by the configuration entity, refer to the foregoing method embodiments. Details are not described herein again.

An embodiment of the present disclosure further provides a computer storage medium configured to store a computer software instruction used by the terminal, the home platform server, or the configuration entity. The computer storage medium includes program code designed for the terminal, the home platform server, or the configuration entity to perform the foregoing aspects. The stored program code is executed, to coordinate parameters configured by configuration entities for a PC5 interface of the terminal, and avoid a conflict between the configuration parameters of the configuration entities.

An embodiment of the present disclosure further provides a computer program product. The computer program product includes a computer software instruction, where the computer software instruction may be loaded by using a processor to implement the method in the foregoing method embodiments.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus or a device, or a computer program product. Therefore, the present disclosure may use a form of hardware only embodiments, software only embodiments, or embodiments with a combination of software and hardware. The embodiments are collectively referred to as "modules" or "systems" herein. Moreover, the present disclosure may use a form of a computer program product that is implemented on one or more computer-usable storage media (including but not limited to a disk memory, a CD-ROM, an optical memory, and the like) that include computer-usable program code. A computer program is stored/distributed in a proper medium and is provided as or used as a part of hardware together with another hardware, or another distribution form may be used. For example, the Internet or another wired or wireless telecommunications system is used.

The present disclosure is described with reference to the flowcharts and/or block diagrams of the method, the apparatus or device, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may also be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments of the present disclosure, obviously, various modifications and combinations may be made to the present disclosure without departing from the spirit and scope of the present disclosure. Correspondingly, the specification and the accompanying drawings are merely examples for description of the present disclosure defined by the accompanying claims, and are considered as any of or all modifications, variations, combinations or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method implemented by a terminal and comprising:
   obtaining first configuration parameters generated by configuration entities;
   summarizing the first configuration parameters according to a configuration rule to generate a second configuration parameter, wherein the configuration rule comprises a configuration entity identifier and a configuration permission; and
   configuring a PC5 interface of the terminal based on the second configuration parameter.

2. The method of claim 1, further comprising receiving the configuration rule from a home platform server, wherein the configuration rule further comprises a configuration priority.

3. The method of claim 1, wherein obtaining the first configuration parameters comprises:
   sending, to a home platform server, a request message requesting configuration parameters of the PC5 interface; and
   receiving, from the home platform server in response to the request message, the first configuration parameters.

4. The method of claim 1, wherein obtaining the first configuration parameters comprises:
   sending, to the configuration entities, a request message requesting configuration parameters generated by the configuration entities; and
   receiving, from the configuration entities in response to the request message, the first configuration parameters.

5. The method of claim 1, further comprising:
   sending, to a home platform server, a request message requesting updated configuration parameters of the PC5 interface;
   obtaining, in response to the request message, updated first configuration parameters generated by the configuration entities; and
   summarizing the updated first configuration parameters according to the configuration rule to generate an updated second configuration parameter.

6. The method of claim 5, further comprising further sending the request message when switching between regions, wherein the updated second configuration parameter comprises groups of configuration parameters for configuring the PC5 interface in different regions.

7. The method of claim 1, further comprising:

sending, to the configuration entities, a request message requesting updated configuration parameters of the PC5 interface;
obtaining, in response to the request message, updated first configuration parameters generated by the configuration entities; and
summarizing the updated first configuration parameters according to the configuration rule to generate an updated second configuration parameter.

8. The method of claim 7, wherein the request message requests an update to at least one of the first configuration parameters.

9. A method comprising:
   receiving first configuration parameters from configuration entities;
   summarizing the first configuration parameters according to a configuration rule to generate a second configuration parameter, wherein the configuration rule comprises a configuration entity identifier and a configuration permission; and
   sending the second configuration parameter to a terminal.

10. The method of claim 9, wherein the method is implemented by a first configuration entity.

11. The method of claim 9, wherein the method is implemented by a home server.

12. The method of claim 11, further comprising:
    receiving, from the terminal, a first request message requesting configuration parameters of a PC5 interface of the terminal;
    generating, in response to the first request message, a second request message requesting the configuration parameters; and
    sending, to the configuration entities, the second request message.

13. The method of claim 12, further comprising generating the configuration rule, wherein the configuration rule further comprises a configuration priority.

14. The method of claim 12, further comprising:
    receiving, from the terminal, a third request message requesting updated configuration parameters of the PC5 interface;
    generating, in response to the third request message, a fourth request message requesting the updated configuration parameters;
    sending, to the configuration entities, the fourth request message;
    receiving, from the configuration entities in response to the fourth request message, updated first configuration parameters;
    summarizing the updated first configuration parameters according to the configuration rule to generate an updated second configuration parameter; and
    sending, to the terminal, the updated second configuration parameter.

15. The method of claim 14, wherein the updated second configuration parameter comprises groups of configuration parameters for configuring the PC5 interface in different regions.

16. A terminal comprising:
    a memory configured to store instructions; and
    a processor coupled to the memory and configured to execute the instructions to:
        obtain first configuration parameters generated by configuration entities;
        summarize the first configuration parameters according to a configuration rule to generate a second configuration parameter, wherein the configuration rule comprises a configuration entity identifier and a configuration permission; and configure a PC5 interface of the terminal based on the second configuration parameter.

17. The terminal of claim 16, wherein the processor is further configured to receive the configuration rule from a home platform server, and wherein the configuration rule further comprises a configuration priority.

18. The terminal of claim 16, wherein the processor is further configured to:

send, to a home platform server, a request message requesting configuration parameters of the PC5 interface; and receive, from the home platform server in response to the request message, the first configuration parameters.

19. The terminal of claim 16, wherein the processor is further configured to:

send, to the configuration entities, a request message requesting configuration parameters generated by the configuration entities, and receive, from the configuration entities in response to the request message, the first configuration parameters.

20. The terminal of claim 16, wherein the processor is further configured to:

send, to a home platform server, a request message requesting updated configuration parameters of the PC5 interface;

obtain, in response to the request message, updated first configuration parameters generated by the configuration entities; and summarize the updated first configuration parameters according to the configuration rule to generate an updated second configuration parameter.

* * * * *